United States Patent [19]

Shimizu et al.

[11] Patent Number: 4,819,163
[45] Date of Patent: Apr. 4, 1989

[54] DRIVING POWER CONTROL SYSTEM

[75] Inventors: Hidetoshi Shimizu, Mishima; Shigeru Terada; Yasuhiko Mishio, both of Susono, all of Japan

[73] Assignee: Toyota Jidosha Kabushiki Kaisha, Toyota, Japan

[21] Appl. No.: 936,349

[22] Filed: Dec. 1, 1986

[30] Foreign Application Priority Data

Dec. 21, 1985 [JP] Japan .................................. 60-288165
Jan. 7, 1986 [JP] Japan ........................................ 61-948
Feb. 3, 1986 [JP] Japan .................................... 61-21692

[51] Int. Cl.$^4$ ............................................... B60K 41/08
[52] U.S. Cl. .................................. 364/424.1; 74/858; 74/866; 74/872
[58] Field of Search ............... 364/424.1; 74/865, 866, 74/867, 872, 877, 859, 858; 474/70

[56] References Cited

U.S. PATENT DOCUMENTS

| | | | |
|---|---|---|---|
| 4,266,447 | 5/1981 | Heess et al. | 74/858 |
| 4,355,550 | 10/1982 | Will et al. | 74/872 |
| 4,370,903 | 2/1983 | Stroh et al. | 74/858 |
| 4,380,048 | 4/1983 | Kishi et al. | 364/424.1 |
| 4,403,527 | 9/1983 | Mohl et al. | 74/851 |
| 4,492,112 | 1/1985 | Igarashi et al. | 364/424.1 X |
| 4,637,278 | 1/1987 | Nishikawa et al. | 74/866 |
| 4,648,040 | 3/1987 | Cornell et al. | 364/424.1 |
| 4,663,713 | 5/1987 | Cornell et al. | 364/424.1 |
| 4,680,988 | 7/1987 | Mori | 364/424.1 X |
| 4,688,450 | 8/1987 | Hayashi et al. | 74/866 |
| 4,698,763 | 10/1987 | Smyth | 74/866 X |

FOREIGN PATENT DOCUMENTS

| | | |
|---|---|---|
| 0120191 | 12/1983 | European Pat. Off. . |
| 0097765 | 1/1987 | European Pat. Off. . |
| 3507126 | 8/1985 | Fed. Rep. of Germany ... 364/424.1 |
| 3334719 | 5/1986 | Fed. Rep. of Germany . |
| 58-174749 | 10/1983 | Japan . |
| 59-99046 | 6/1984 | Japan . |
| 2151727 | 3/1984 | United Kingdom . |

OTHER PUBLICATIONS

Patent Abstracts of Japan, vol. 10, No. 6 (M-445) [2063], Jan. 11, 1986; & JP-A-60 168 923 (Hitachi Seisakusho K.K.) 02-09-1985 (Cat. A.).

Primary Examiner—P. S. Lall
Assistant Examiner—V. N. Trans
Attorney, Agent, or Firm—Oblon, Fisher, Spivak, McClelland & Maier

[57] ABSTRACT

A driving power control system for a vehicle which minimizes the shock due to a gear change by keeping a driving force constant throughout the shifting, resulting in high drivability. The system includes a mechanism for controlling the engine power to keep driving force unchanged, mechanisms for respectively keeping the acceleration and driving force constant throughout the shifting, and a second throttle valve for controlling the engine power.

17 Claims, 30 Drawing Sheets

4,819,163

DRIVING POWER CONTROL SYSTEM

BACKGROUND OF THE INVENTION

1. Technical Field

The present invention relates generally to a driving power control system for a vehicle and more particularly to a driving power control system for a vehicle which keeps an unchanged driving power after the shift by an automatic transmission.

2. Prior Art

Prior art driving system, as shown in FIG. 26, allows an automatic transmission ATM to convert the output from an engine EG into a driving power. Within the automatic transmission ATM, a throttle valve THVO controls throttle pressure in response to the operating degree of an accelerator (pedal) ACP, and a control circuit COM drives solenoid valves No. 1 and No. 2 (S1 and S2) according to a shifting pattern shown in FIG. 27. A throttle position (opening) sensor THPS and a vehicle speed sensor SS therefor sense the opening of the throttle valve THVA and a vehicle speed representative of the speed of a driven output shaft OPS, which is provided with the automatic transmission ATM, respectively. The shifting pattern is stairs-like in FIG. 27, wherein solid and broken lines represent upshifting characteristic and downshifting one, respectively.

Published Unexamined Japanese Patent Application No. 58-174749 discloses a control system for the driving power from the automatic transmission ATM, which reduces upshifting shocks. The system controls the energy emitted from a drive line by reducing the output from the engine EG by limiting the specific volume of intake air thereof.

Published Unexamined Japanese Patent Application No. 59-99046 further discloses a control system, which controls the speed of varying the opening of the throttle valve THVA in response to the increased response of the speed of the engine EG. The control is executed in response to a required gear position and the operating degree of the accelerator ACP.

These, however, prevent neither of the following shifting shocks; one is caused by the stairs-likely reduced driving power in the case of upshifting, and the other is caused in the opposite case, both being shown in FIG. 28. The latter, which generates when the accelerator ACP operates to such a degree that the throttle opening exceeds a value plotted on a downshifting line shown in FIG. 27, is especially big. Since it is caused by both increased driving torque due to the higher gear ratio and increased torque from the engine EG due to the higher operating degree of the accelerator ACP after a shift.

Another problem is that stairs-like increased acceleration is unavailable during the shift by the automatic transmission. When the accelerator ACP operates in fourth gear, as shown in FIG. 29, for example, acceleration increases gradually to G1. However, during a shift to third, acceleration increases from G1 to G2 abruptly, thus the acceleration therebetween fails to be stably utilized. It further causes a problem of frequent shifts.

SUMMARY OF THE INVENTION

It is therefore an object of the present invention to provide a driving power control system for a vehicle which effectively prevents shifting shocks.

It is another object of the present invention to provide a driving power control system for a vehicle which controls an engine power to such an amount as to keep an unchanged driving power after a shift.

It is yet another object of the present invention to provide a driving power control system for a vehicle which controls both a driving power and acceleration continuously as well as gradually, thereby offering high drivability.

It is still another object of the present invention to provide a driving power control system for a vehicle which refers to a gear position and an engine load for controlling an engine power to such an amount as to keep an unchanged acceleration after a shift.

It is another object of the present invention to provide a driving power control system for a vehicle which controls the opening of a second throttle valve to such an angle as to keep an unchanged driving power after a shift.

It is a further object of the present invention to provide a driving power control system for a vehicle with a first throttle valve connected to an accelerator, in response to the opening of which, a driving power is controlled even if the second throttle valve breaks down.

It is another object of the present invention to provide a driving power control system for a vehicle which offers high drivability and reliability.

In accordance with the present invention, a driving power control system for a vehicle having an automatic transmission which connects to an engine, receives an engine power output from the engine and transmits a driving power via a ranged gear thereof to a driving wheel, comprising: means for detecting a present gear position and for determining a subsequent gear position when a shift in gear positions is required in the automatic transmission; means for detecting variables indicative of an operating degree of an acceleration mechanism and a running condition of the vehicle, respectively, and for computing a desired driving power in accordance with the detected variables; engine output control means for controlling an engine output; means for computing a first desired operating amount for the engine output control means so as to generate the desired driving power at the present gear position, and for controlling the engine output control means to operate at the computed first desired amount at the start of a shift in gear positions; and means for computing a second desired operating amount for the engine output control means so as to generate said desired driving power at the shifted gear position, and for controlling the engine output control means to operate at the computed second desired amount upon the completion of the shift in gear positions, thereby substantially equalizing said driving power before and after the shift in gear positions.

BRIEF DESCRIPTION OF THE DRAWINGS

The above and other objects, features and advantages of the present invention will become apparent from the following specification taken in conjunction with the accompanying drawings wherein like reference numerals refer to like parts, and wherein.

DETAILED DESCRIPTION OF THE PREFERRED EMBODIMENT

Figure 1:
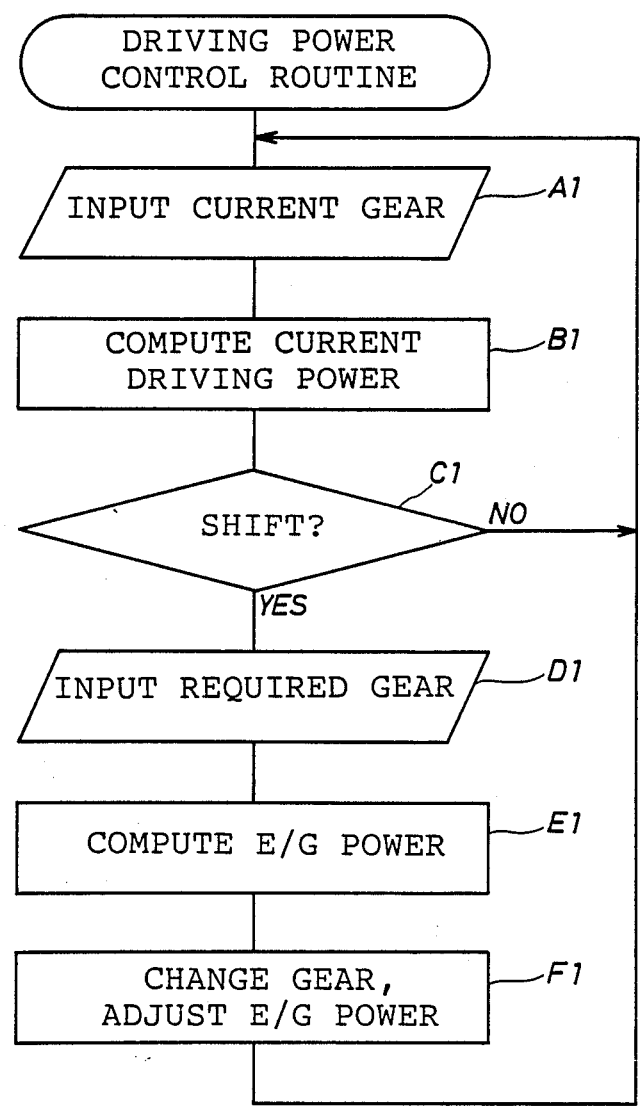
FIG. 1 is a flow chart showing the structure of a driving power control system for a vehicle according to a first invention.

Referring now to FIG. 1, the current driving power from an automatic transmission in a current gear position (step A1)is derived (step B1). When a gear change is required (step C1), a required engine power for keeping the unchanged driving power in a required gear position (step D1) is computed (step E1). Then, the gear is changed to the required position in order to adjust the engine power to the computed value (step F1).

A current gear position is sensed from the shift lever position of the automatic transmission, the flag of the computer for a shift control thereof, or from the operating condition thereof.

Current driving power is derived from a torque output from the automatic transmission sensed by a torque sensor, or the computation in response to engine power and a gear ratio.

A required gear position is determined, for example, by a shift lever position, or a computer for detecting the engine speed, engine power, fuel consumption ratio, or by an operator's request.

Engine power is controlled to maintain the estimated acceleration of the vehicle throughout the gear changing in accordance with the value obtained by coordinating the engine power with gear ratio.

Engine power is controlled by varying the intake air amount, ignition timing, or fuel injection amount. The value of the engine power is detected by a torque sensor or computed in response to the engine speed and the intake air amount.

An available system for controlling engine power to a required value is a feedback control system including a torque sensor for sensing engine power torque or the driving output torque from the automatic transmission. Another available system computes an intake air amount for realizing a desired engine power, and drives a throttle valve at the position responsive thereto.

The present invention controls engine power to minimize the difference between the actual driving power before gear changing and the estimated driving power thereafter. It thus prevents a sharp rise or drop in driving power, thereby reducing the shock.

Figure 2:
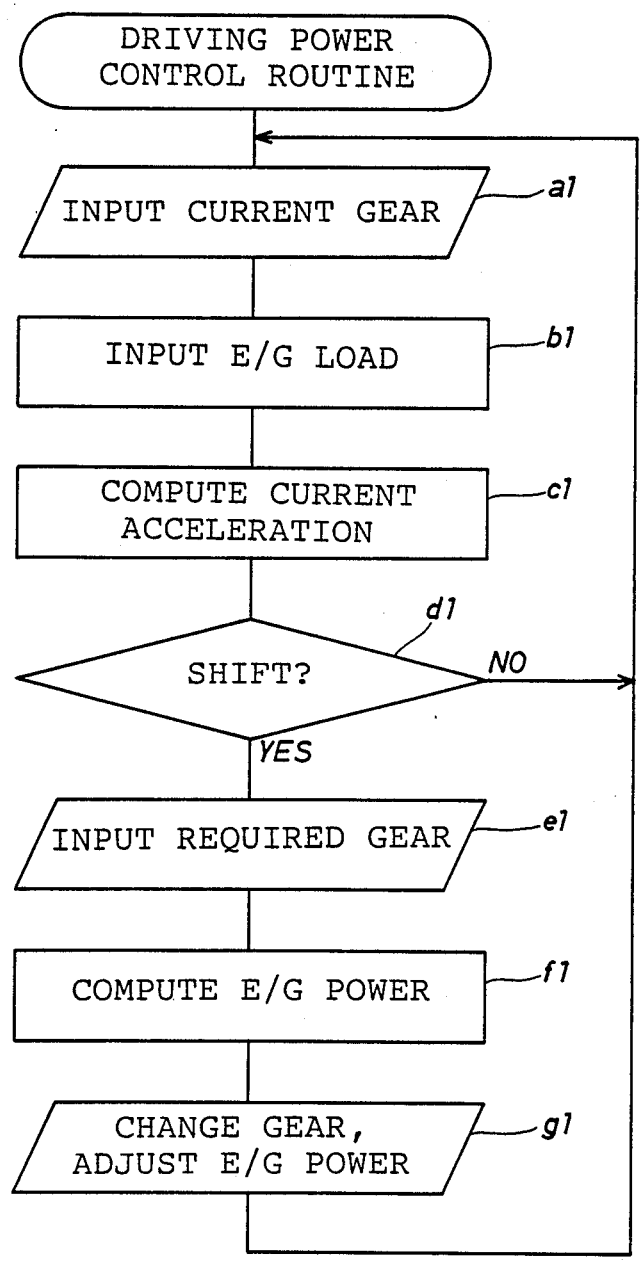
FIG. 2 is a flow chart showing the structure of a driving power control system for a vehicle according to a second invention.

Referring to FIG. 2, the current acceleration of a vehicle is derived (step c1), from a current gear position (step a1) and an engine load (step b1). When a gear change is required (step d1), engine power is computed in such a manner that the estimated acceleration with the required gear position (step e1)is to be the same as the current acceleration (step f1). Then, the gear is changed to the required position in order to adjust the engine power to the computed value (step g1).

An engine load might be correlated with an operating degree of accelerator, a throttle valve position, or a measured value of an intake air amount.

A current acceleration of a vehicle is estimated or computed from the engine load in the current gear position.

Engine power is controlled to a target value by the torque sensor which detects either engine torque or driving torque of the automatic transmission in order to execute feedback control, or controlled in accordance with a computation of an intake air amount which provides the target value of an engine power needed to adjust the throttle valve to the proper degree in response thereto. The present invention controls engine power to minimize the difference between the actual acceleration before gear changing and the estimated acceleration thereafter. The engine power is controlled in accordance with the gear ratios both before and after gear changing, and engine load is also controlled to prevent a sharp rise or drop in acceleration, thereby reducing the shock, and resulting in smoother acceleration.

Figure 3:
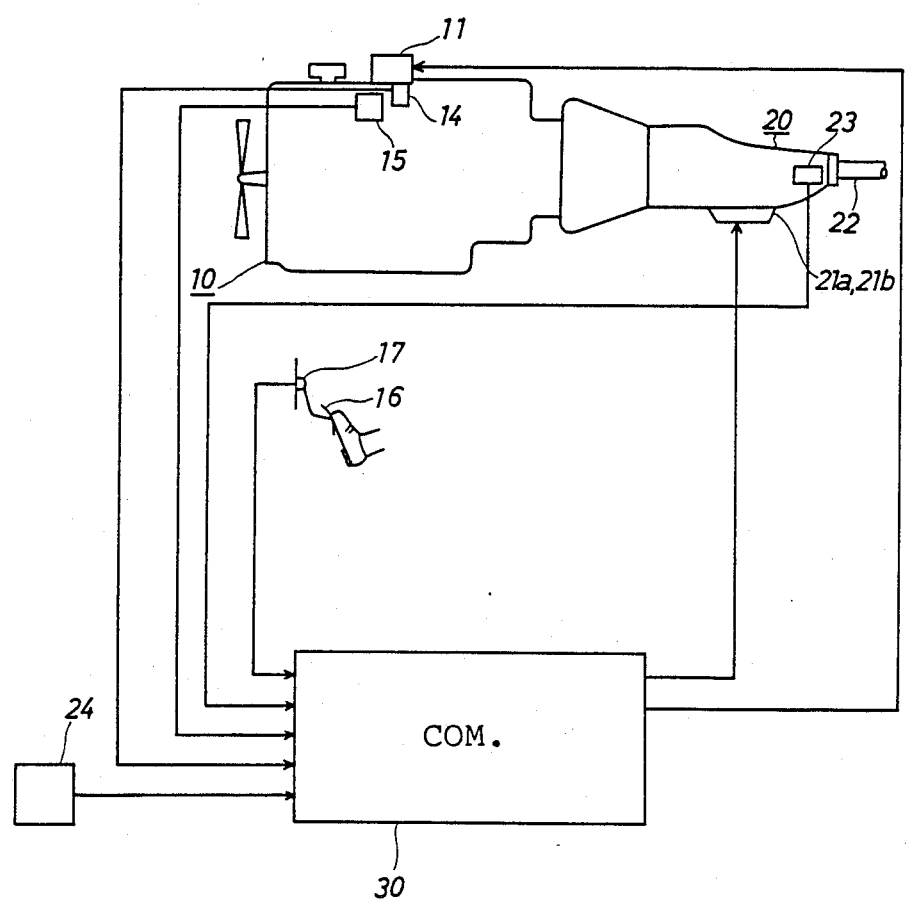
FIG. 3 is a system diagram of a first embodiment of the present invention.
Figure 4:
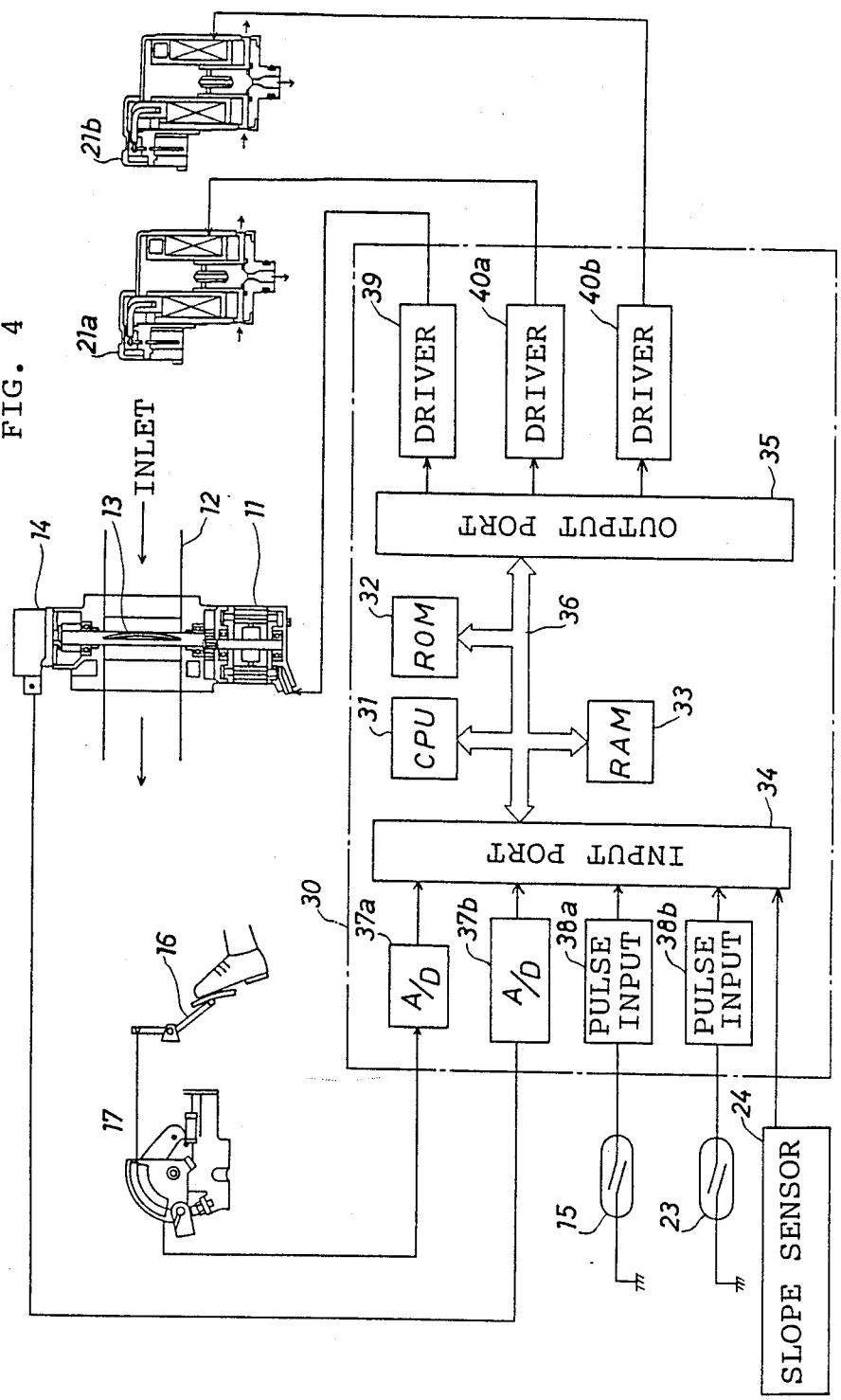
FIG. 4 is a block diagram showing the structure of the first embodiment.

Referring now to FIGS. 3 and 4, therein is shown a system of the first embodiment. An engine 10 allows a throttle-actuator 11 to selectively open and close a throttle valve 13, which is provided in an intake pipe 12 and comprises engine output control means, thereby controlling its output. An automatic transmission 20, due to two solenoid valves (No. 1, No. 2) 21a and 21b, enables four-speed transmission. The throttle actuator 11, and the solenoid valves 21a and 21b are driven in response to signals output from a control circuit 30, to which signals are input from sensors provided for parts of the vehicle such as the engine 10, and the automatic transmission 20.

One of the sensors is a throttle position sensor 14, which senses the opening of the throttle valve 13. Another is an engine speed sensor 15, which senses the speed of the engine 10. A third is an accelerator sensor 17, which senses the operating degree of an accelerator 16. A fourth is a vehicle speed sensor 23, which senses the revolution of an output shaft 22 provided for the automatic transmission, the revolution being proportional to the vehicle speed. A fifth is a slope sensor 24, which senses the slope of the road in response to the rate of change in air pressure.

The throttle position sensor 14 provides a signal proportional to the opening of the throttle valve 13, and the accelerator sensor 17 provides a signal proportional to the operating degree of the accelerator 16. The engine speed sensor 15 provides a pulse signal, the frequency of which is proportional to the speed of the engine 10, and the vehicle speed sensor 23 further provides a pulse signal, the frequency of which is proportional to the vehicle speed.

The control circuit 30 comprises a micro computer including a central processing unit (CPU) 31, a read only memory (ROM) 32, a random access memory (RAM) 33, an input port 34, and an output port 35, which are interconnected through a common bus 36. The sensors provide signals through A/D converters 37a and 37b, and a pulse input ports 38a and 38b to the input port 34. The output port 35 is connected to a throttle actuator driver 39, and solenoid valve drivers 40a and 40b.

Figure 5:
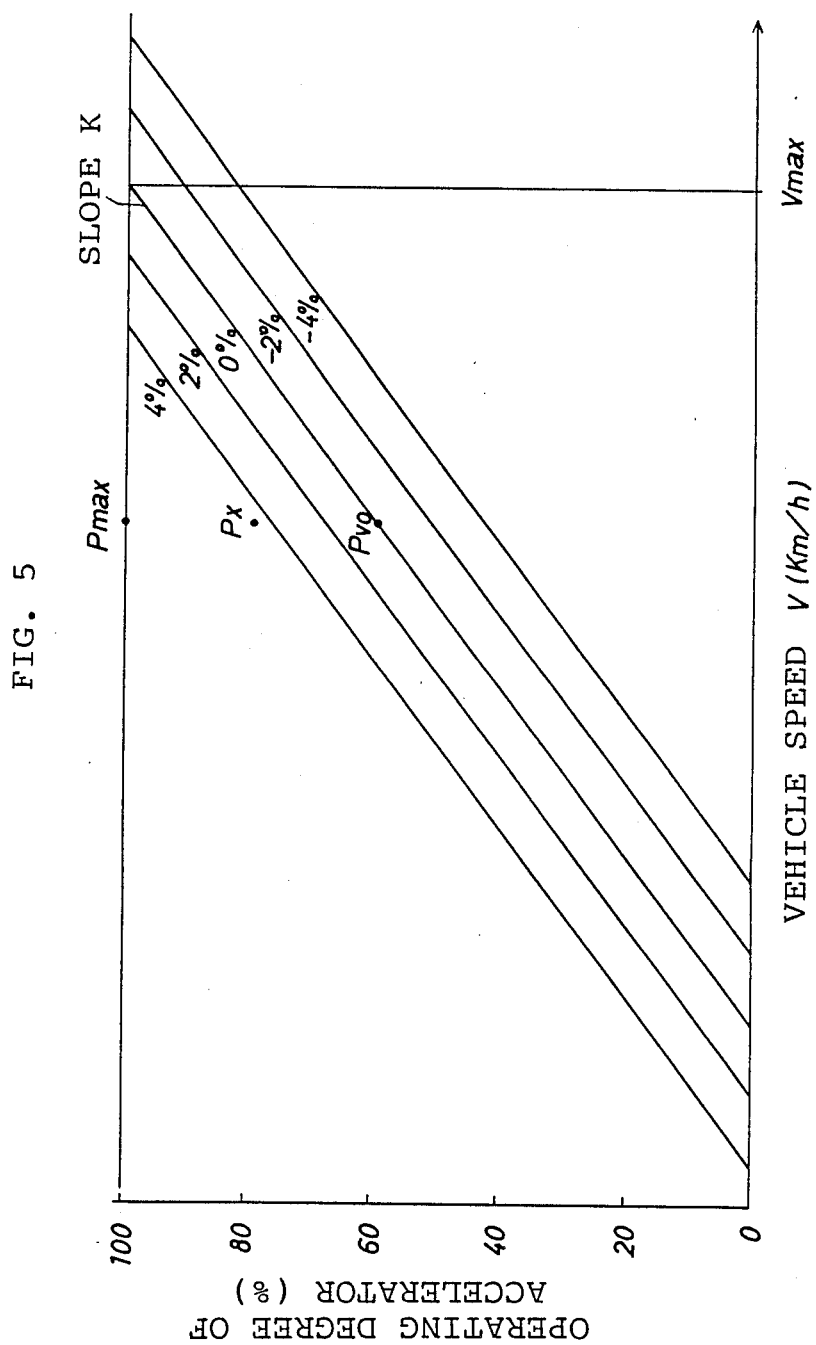
FIG. 5 is a graph showing a slope characteristic of the first embodiment.
Figure 6:
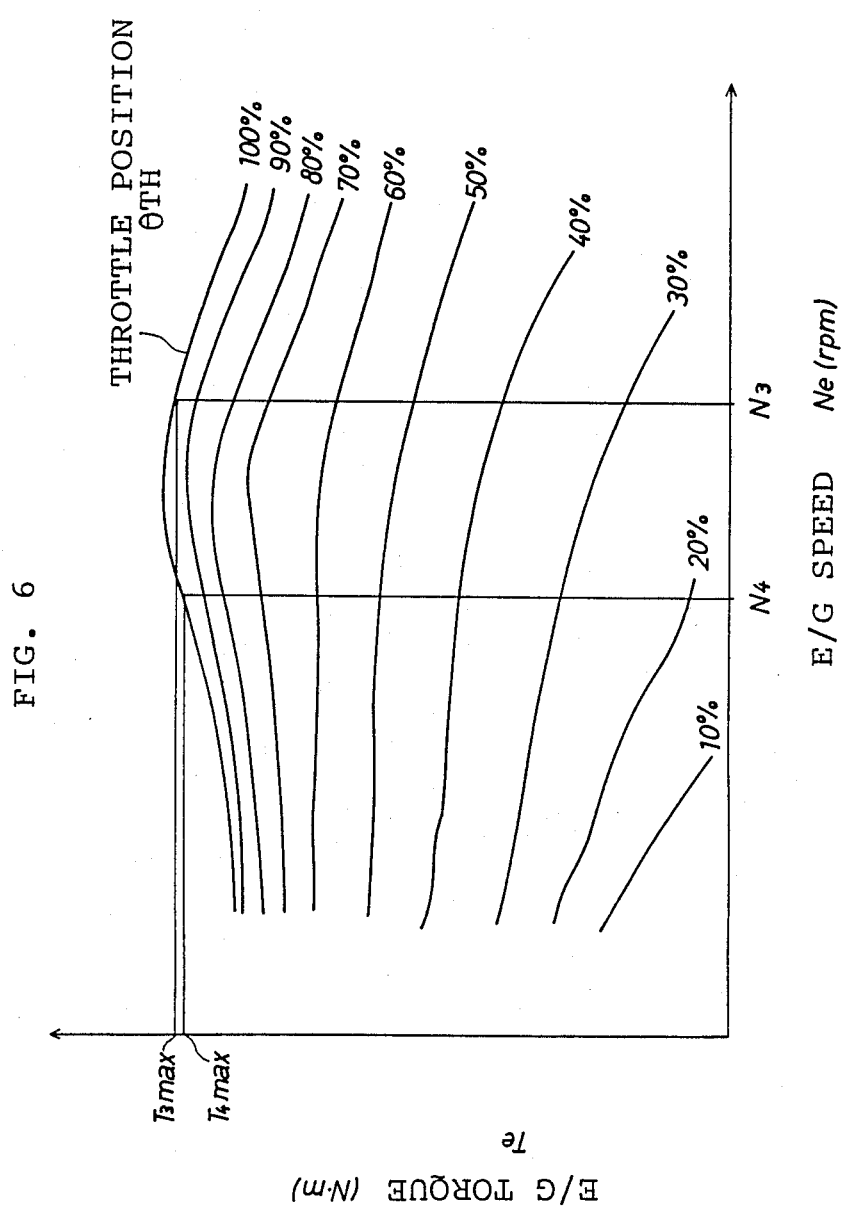
FIG. 6 is a graph showing a throttle opening characteristic of the first embodiment.

The ROM 32 within the micro computer stores the lines shown in FIG. 5, for deriving the operating degree of accelerator at a constant speed Pv0 from a gear position G, a vehicle speed V, and a slope K, and curves shown in FIG. 6, for deriving an engine torque Te from an engine speed Ne and a throttle opening theta-th.

Figure 7:
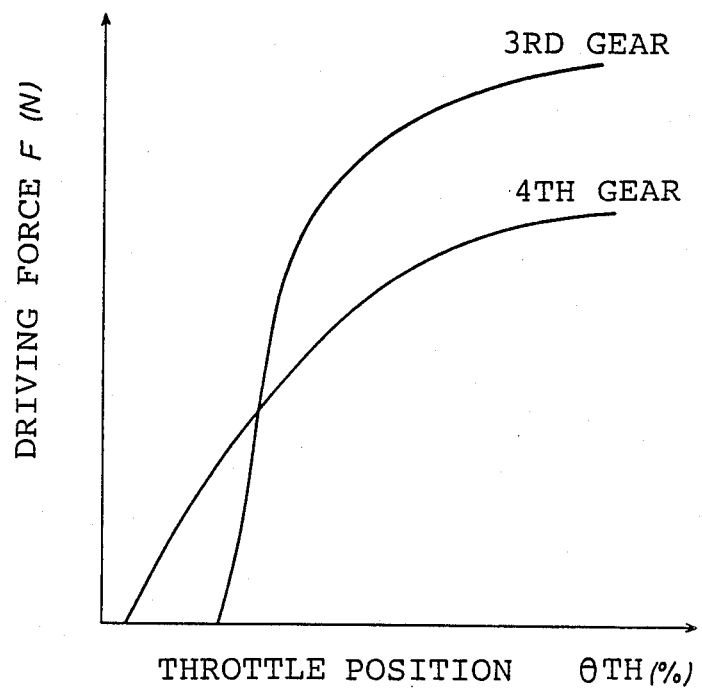
FIG. 7 is a graph showing a driving force characteristic of the first embodiment

Referring now to FIG. 7, therein are shown the curves utilized for the driving power control according to the present embodiment, each representing the relationship between a throttle opening theta-th and a driving force F at a predetermined vehicle speed V in third and fourth gear, respectively. Set forth below is explained how to derive the curves referring to FIG. 6.

Lines N4 and N3 in FIG. 6 represent an engine speed Ne at a certain vehicle speed (40 km/h, for example) in fourth gear, and the same in third, respectively. The curves in FIG. 6 determine a throttle opening theta th and an engine torque Te corresponding to a respective gear position G. The curves in FIG. 7 thus represent a driving force F, which is computed from the engine torque Te from the following equation:

$$F = \{(Te \times R)/r\}(N),$$

where R and r designate a gear ratio and the radius of a vehicle wheel, respectively. A control system for the throttle opening theta-th, hereinafter referred, introduces the curves in FIG. 7, thereby sending out to the throttle actuator 11 the signal representative of the opening of the throttle valve 13, which realizes the desired driving force F in a certain gear position G.

Figure 8:
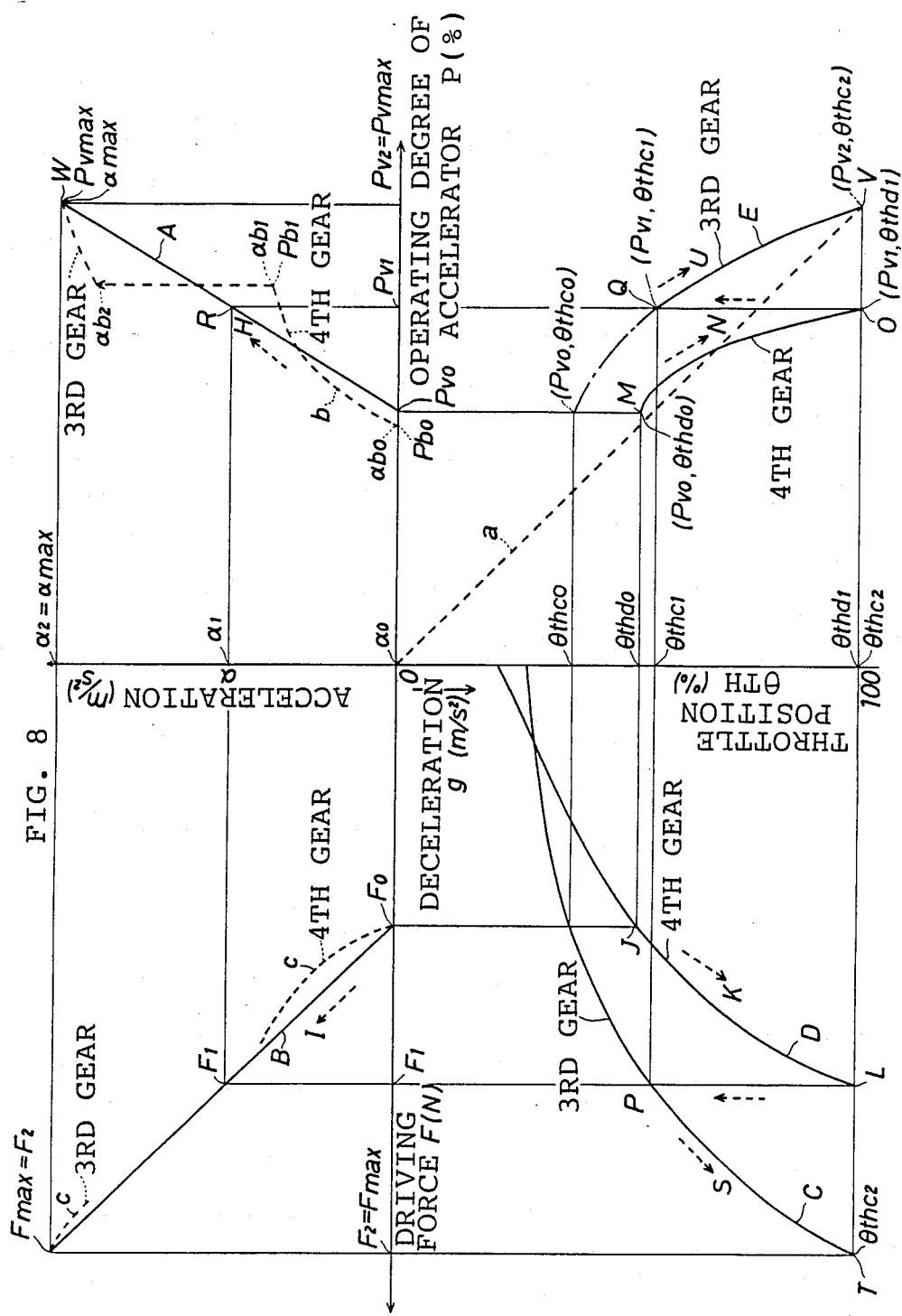
FIG. 8 is a graph showing a characteristic of an operation of the first embodiment.

Referring now to FIG. 8, is explained the operation of the present embodiment. In FIG. 8, solid lines show the interrelationship among acceleration alpha, a driving force F, a gear position G, a throttle opening theta-th, and the operating degree of accelerator P at a predetermined vehicle speed V in the case of the present embodiment, while broken lines show a shifting operation of the prior art.

Since an accelerator 16 is connected directly to a throttle valve 13 in the prior art, the operating degree of accelerator P(%) and the throttle opening theta-th(%) change proportionally to each other, as shown by a line a. The acceleration alpha(m/s$^2$), which is shown by a line b, increases from Pb0 to Pb1 continuously in proportion to increased driving force F, which is shown by a line c, while the operating degree of accelerator P(%) increases from Pb0 to Pb1. Gear is then downshifted from fourth to third, the difference therebetween increases the torque, consequently the driving force. In response thereto, the acceleration increases abruptly from alpha-b1 to alpha-b2. The prior art thus allows a sharp rise or drop in acceleration on shifting.

On the other hand, with an object to reduce such a rise or drop, the present embodiment controls the acceleration alpha to increase continuously to its maximum alpha-max in response to increased operating degree of accelerator P from Pv0 to Pvmax, which is shown by a line A. Therein Pv0 and Pvmax designate the acceleration at the constant speed, and that of the maximum value, respectively. Set forth below is the above-mentioned control explained.

It is available for changing gradually the acceleration in spite of a gear change, to provide the vehicle gradually additional driving force F as shown by a line B. Therein a driving force F0 represents the driving force F at the constant speed, that is, in the case of the acceleration of 0, and Fmax represents a maximum driving force F in the case of the maximum acceleration alpha-max.

Thereafter is derived the throttle opening theta-th(%) corresponding to the gear position for generating the above-mentioned driving force F referring to curves C and D. The curves show the relationship between the throttle opening and the driving force, which is derived in the similar manner as the curves in the FIG. 7. Controlling the throttle opening theta-th, which is derived in the above described manner, in response to the operating degree of accelerator P, increases the acceleration alpha from zero to alpha-max.

One example of the above-described control is shown by a curve E, therein is shown the characteristic of a throttle opening theta-th(%) corresponding to a gear position G for realizing a gradual acceleration in response to the operating degree of accelerator P(%). Set forth below is the curve E explained, referring to its operation in the case of the change from Pv0 to Pvmax along the line A.

The throttle opening theta-th in the case of Pv0, which keeps the constant speed, is derived as openings theta-thc0 and theta-thd0. They provide the acceleration of zero in third and fourth, respectively. If the operating degree of accelerator P is Pv1, the acceleration shown by the line A and the driving force shown by the line B are alph-1 and F1, respectively. theta-thc1 and theta-thd1 are thus derived as the throttle opening theta-th for realizing the acceleration alpha-1 in the case of Pv1, from the curves C and D, respectively. The throttle opening theta-th(%) in the curve D, in this case, amounts to 100%.

Within the operating degree of accelerator of Pv1, the throttle opening theta-th is controlled referring selectively to the curves C and D. Over Pv1, a predetermined acceleration is realized in third gear referring to the curve C, and with the operating degree of accelerator of Pv2, the throttle opening amounts to 100%=theta-thc2. It is also available to realize the higher acceleration by downshifting from third to second, with Pv2 set below 100%. It is further available, if the unchanged driving force F is output, to select the higher gear, that is, the lower gear ratio, which yields better fuel consumption.

Figure 9:
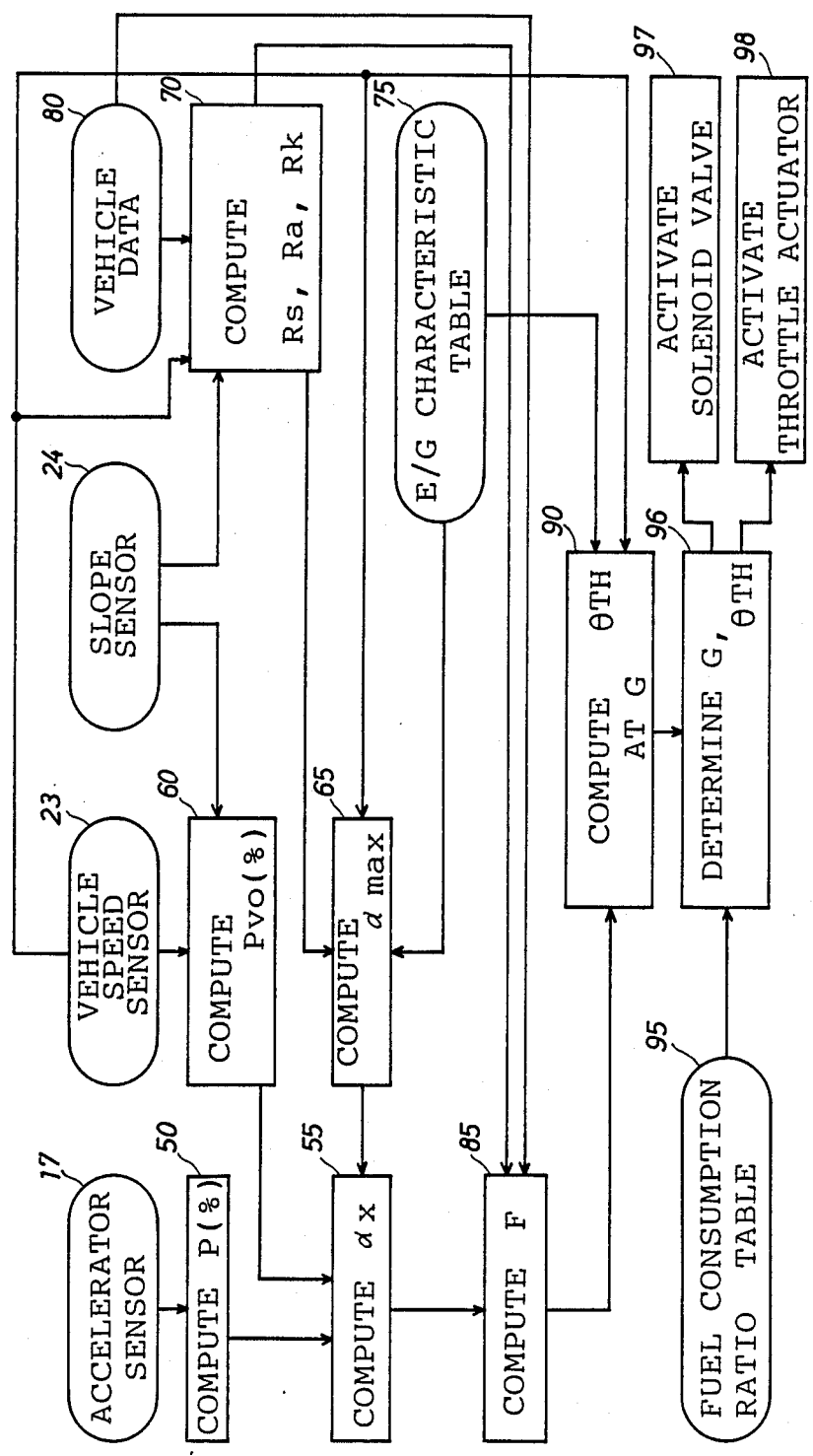
FIG. 9 is a block diagram showing the principle of the first embodiment.

Referring now to FIG. 9, therein is shown the logic for producing the lines A-E in FIG. 8.

At step 50, the operating degree of accelerator P(%) is computed from a sensed value by the accelerator sensor 17. At step 55, a desired acceleration alpha-x, which corresponds to P, is computed. The operating degree of accelerator at a constant speed Pv0(%) and a maximum acceleration alpha-max are therefore computed besides P, at steps 60 and 65, respectively. The former is derived from sensed values by the vehicle speed sensor 23 and the slope sensor 24, and the lines in FIG. 5, and the latter from a sensed value by the vehicle speed sensor 23, rolling resister Rs, air resister Ra, and slope resister Rk, and the table of the engine characteristic 75 in FIG. 6. The resisters are computed from sensed values by the vehicle speed sensor 23 and the slope sensor 24, and vehicle data 80 at step 70.

At step 85, a required driving force F, which realizes the desired acceleration alpha-x, is computed from the resisters Rs, Ra, and Rk, and the vehicle data 80. At step 90, a throttle opening theta-th corresponding to a gear position G is computed from the required driving force F, the table of the engine characteristic 75, and a vehicle speed. At step 96, an optimum gear position, which yields better fuel consumption in the case thereof, is determined by a table of fuel consumption 95. In response to the determination, the solenoid valves and the throttle actuator are driven at step 97 and 98, respectively. Details about the above-described computations at steps 55-98 are left to the explanation of FIG. 10, hereinafter referred to.

Referring further to FIG. 9, are explained the operation of the lines A-E.

When the operating degree of accelerator P(%) exceeds Pv0 in fourth gear, the desired acceleration alpha-x starts increasing along the line A in the direction of an arrow H, that is, towards the maximum acceleration alpha-max (steps 50, 55, 60, and 65). In response thereto, the required driving force F increases along the line B in the direction of an arrow I, and the throttle opening theta-th increases in the direction of an arrow K from a point J to a point L (100%) along the curve D (step 90). The curve D shows the characteristics of both the driving force F and the throttle opening theta-th in fourth gear.

The relationship between the throttle opening theta-th and the operating degree of accelerator P during the increases is plotted on a curve MO along the curve E (step 96). A point O corresponds to the point L along the curve D, where the throttle opening theta-th responsive to the driving force F amounts to 100%. Both the gear position and the throttle opening theta-th thus move to the value plotted on a point P along the curve C, which represents the throttle opening theta-th in third gear for outputting the greater driving force F. The point P corresponds to a point Q along the curve E, which represents the relationship between the throttle opening theta-th and the operating degree of accelerator P.

After the above-mentioned shift to third gear, if the operating degree of accelerator P further increases in the direction of the arrow H over a point R to a point W, the throttle opening theta-th increases in the direction of an arrow S from the point P to a point T along the curve C, and the relationship between theta-th and P changes in the direction of an arrow U from the point Q to a point V along the curve E.

When the operating degree of accelerator P increases from Pv0 to the point W via the point R along the line A in the above described answer, along a line Pv0 R, the throttle opening changes in fourth gear from a point M to a point O along the curve E, and along a line RW it changes in third gear from the point Q to the point V along the same. It realizes the continuous acceleration responsive to the operating degree of accelerator P.

Figure 10:
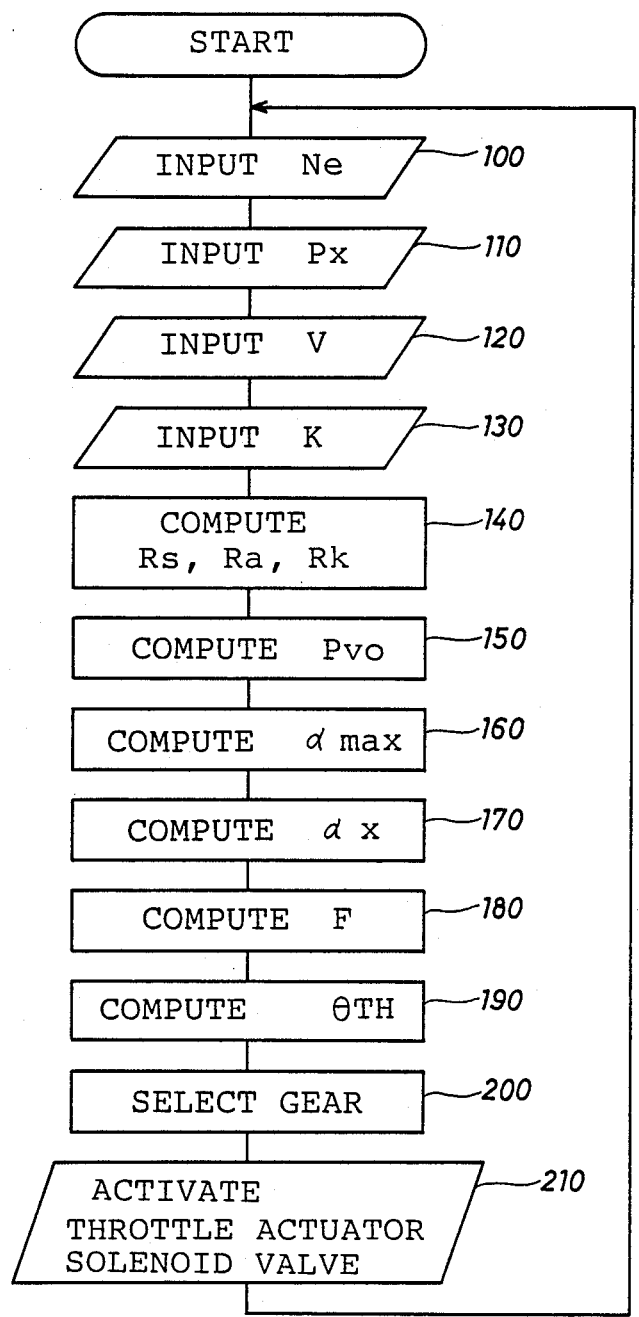
FIG. 10 is a flow chart showing a program of a vehicle driving power control by the first embodiment.

The acceleration thus increases gradually, and the throttle opening therefor operates non-linearly, in spite of a downshifting from fourth gear to third during the increase in the operating degree of accelerator, Referring now to FIG. 10, are the control process steps explained. Driving conditions such as an engine speed Ne, the operating degree of accelerator Px, a vehicle speed V, and a slope K are input at steps 100, 110, 120, and 130, respectively. At step 140, rolling resister Rs, air resister Ra, and slope resister Rk are derived from both the driving conditions and a vehicle data. At step 150, the operating degree of accelerator at a constant speed Pv0 is derived from the vehicle speed V and the slope K referring to lines in FIG. 5.

The program proceeds to step 160, where a maximum acceleration alpha-max at a current vehicle speed V is derived from the input or computed values at the foregoing steps and a gear position G; a maximum of a driving force F, which corresponds to alpha-max, is computed from a maximum of an engine torque Te corresponding to the gear position G for realizing the current vehicle speed V. Referring to FIG. 6, for example, at the vehicle speed V, the engine speed in fourth gear and that in third are represented as lines N4 and N3, respectively. The maximum values of the engine torque Te, T3max in third gear, and T4max in fourth, are derived from the intersection points of the line representing the engine torque Te in the case of the throttle opening of 100% and lines N3 andN4, respectively.

A maximum driving force in third gear F3max is derived from the following equation:

$$F3\text{max} = (T3\text{max} \times R3)/r,$$

where R3 and r designate the gear ratio of third gear, and the radius of the vehicle wheel, respectively.

A maximum driving force in fourth gear F4max is derived from the following equation:

$$F4\text{max} = (T4\text{max} \times R4)/r,$$

where R4 and r designate the gear ratio of fourth gear, and the radius of the vehicle wheel, respectively.

Thereafter is the acceleration alpha-max responsive to the greater of F3max and F4max computed. If the former, for example, is greater, it is derived from the following equation:

$$\text{alpha-max} = \{F3\text{max} - (Rs + Ra + Rk)\}/W,$$

where W designates a vehicle weight.

A maximum deceleration gmax is further derived from the following equation:

$$gmax = \{F + (Rs + Ra + R)\}/W.$$

where F designates an engine braking force.

The program proceeds to step 170, where a desired acceleration alpha-x is computed from a maximum acceleration alpha-max derived at the foregoing steps, the operating degree of accelerator Px, and that at a constant speed Pv0. Alpha-x is determined by proportionally allotted alpha-max by Px. Pv0, Px, Pvmax are defined to correspond to alpha-0, alpha-x, and alpha-max, respectively. The desired acceleration alpha-x is thus derived from the following equation:

$$alpha\ x = alpha\text{-}max \times ((Px - Pv0)/(Pvmax - Pv0)).$$

A desired deceleration gx is similarly derived from the following equation:

$$gx = gmax \times (Pv0 - Px)/Pv0.$$

The program proceeds to step 180, where a required driving force for outputting the above-mentioned desired acceleration alpha-x is derived from the following equation:

$$F = alpha\text{-}x \times W + Rk + Rs + Ra.$$

At step 190, referring to the table shown in FIG. 7, the throttle opening theta-th for outputting the required driving force F is computed in response to the gear position G for realizing the current vehicle speed V.

At step 200, an optimum gear position G, which yields better fuel consumption, is selected referring to the table of fuel consumption ratio (not shown). The highest gear position G possible is thus selected, since the higher gear offers the better fuel consumption. Further on the selection, the operating degree of accelerator P in the case of upshifting is controlled to be lower than that in the case of downshifting, which prevents frequent shift.

The program proceeds to step 210, signals are output to the solenoid valves 21 (21a and 21b) and the throttle actuator 11. One is sent for driving the solenoid valves, which realizes the optimum gear position G derived in the above-described manner, and the other for driving the throttle actuator, which realizes the throttle opening theta-th therein.

Set forth below are the advantages offered by the present embodiment.

An advantage of the present embodiment is the absence of a sharp rise or drop in acceleration and driving force, consequently, that of shifting shocks.

Another advantage is a stably available acceleration alpha and driving force F responsive to an operating degree of accelerator Px. Since the present embodiment provides those continuously as well as gradually.

A further advantage is improved fuel consumption ratio by available full throttle region in a high gear.

Figure 11:
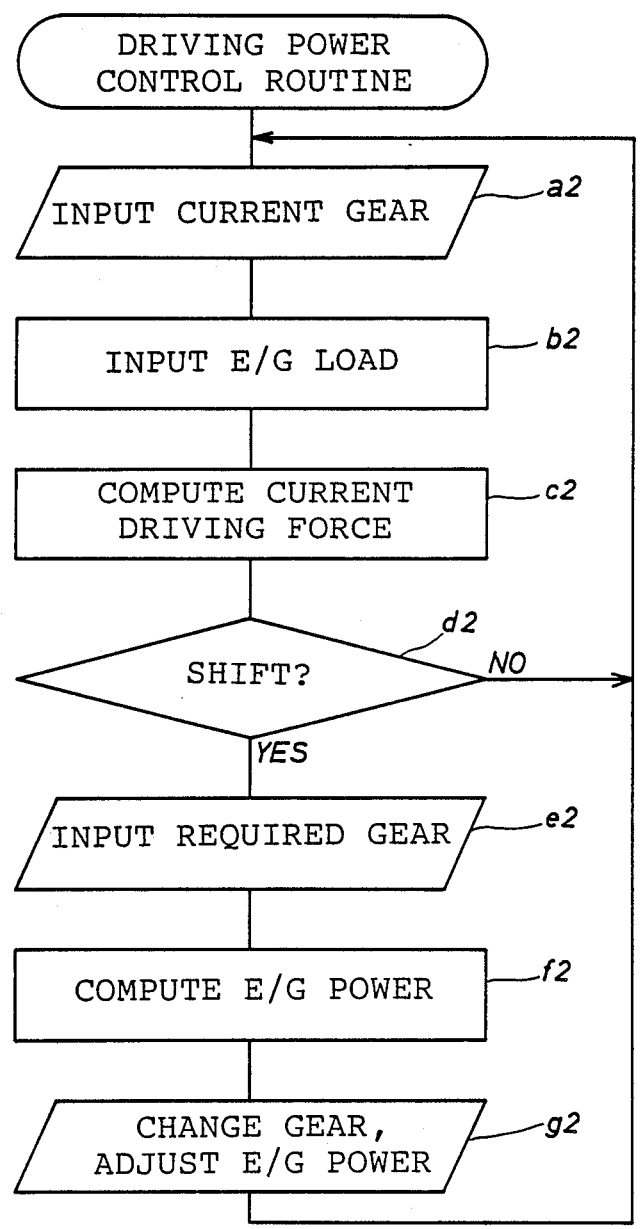
FIG. 11 is a flow chart showing the structure of a second embodiment of the present invention.

Referring to FIG. 11, in a second embodiment, the current driving force of a vehicle is derived (step c2) from a current gear position (step a2) and an engine load (step b2). When a gear change is required (step d2), engine power is computed in such a manner that the estimated driving force with the required gear position (step e2) is to be the same as the current driving force (step f2). Then, the gear is changed to the required position in order to adjust the engine power to the computed value (step g2).

Since a gear position is detected in the same manner as described in th first embodiment of the present invention, it is to be omitted.

An engine load might be correlated with an operating degree of accelerator, a throttle valve position, or a measured value of an intake air amount.

A current driving force of the vehicle is estimated or computed from the engine load in the current gear position.

A required gear position is determined, for example, by a shift lever position, or a computer for detecting the engine speed, engine power, fuel consumption ratio, or by an operator's request.

Engine power is controlled to maintain the estimated driving force of the vehicle throughout the gear changing in accordance with the value obtained by coordinating the engine power with gear ratio.

Engine power is controlled by varying the intake air amount, ignition timing, or fuel injection amount. The value of the engine power is detected by a torque sensor or computed in response to the engine speed and the intake air amount.

Engine power is controlled to a target value by the torque sensor which detects either engine torque or driving torque of the automatic transmission in order to execute feedback control, or controlled in accordance with a calculation of an intake air amount which provides the target value of an engine power needed to adjust the throttle valve to the proper degree in response thereto. The present invention controls engine power to minimize the difference between the actual driving force before gear changing and the estimated driving force thereafter. The engine power is controlled in accordance with the gear ratios both before and after gear changing, and engine load is also controlled to prevent a sharp rise or drop in acceleration, thereby reducing the shock, and resulting in smoother acceleration.

Figure 12:
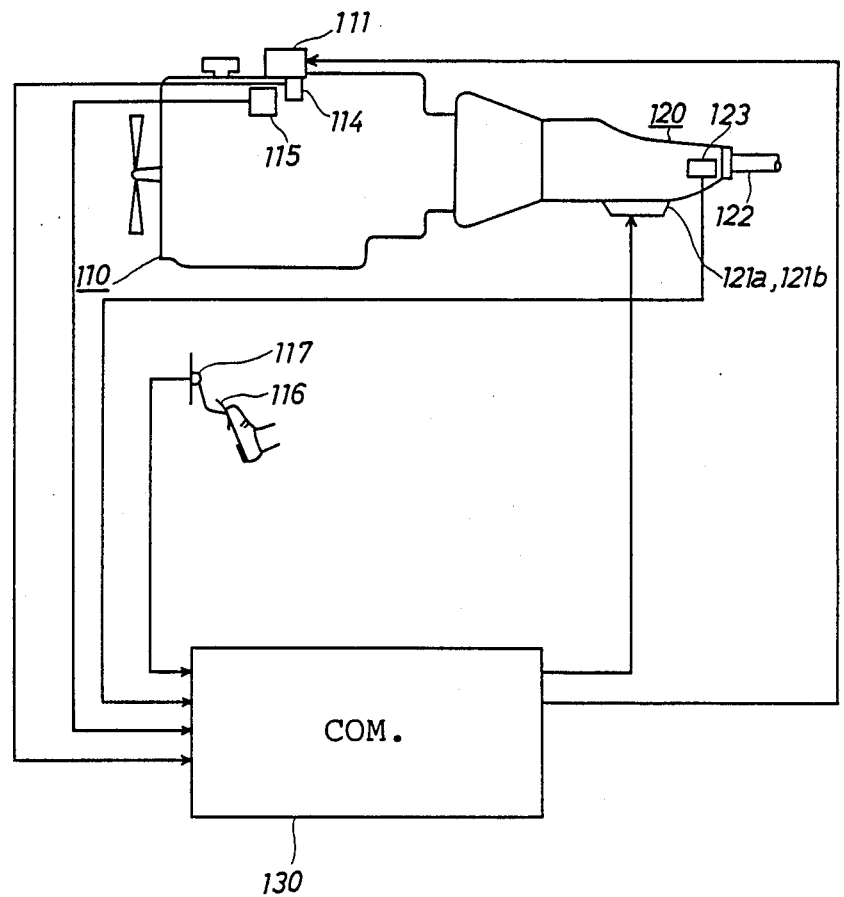
FIG. 12 is a system diagram of the second embodiment.
Figure 13:
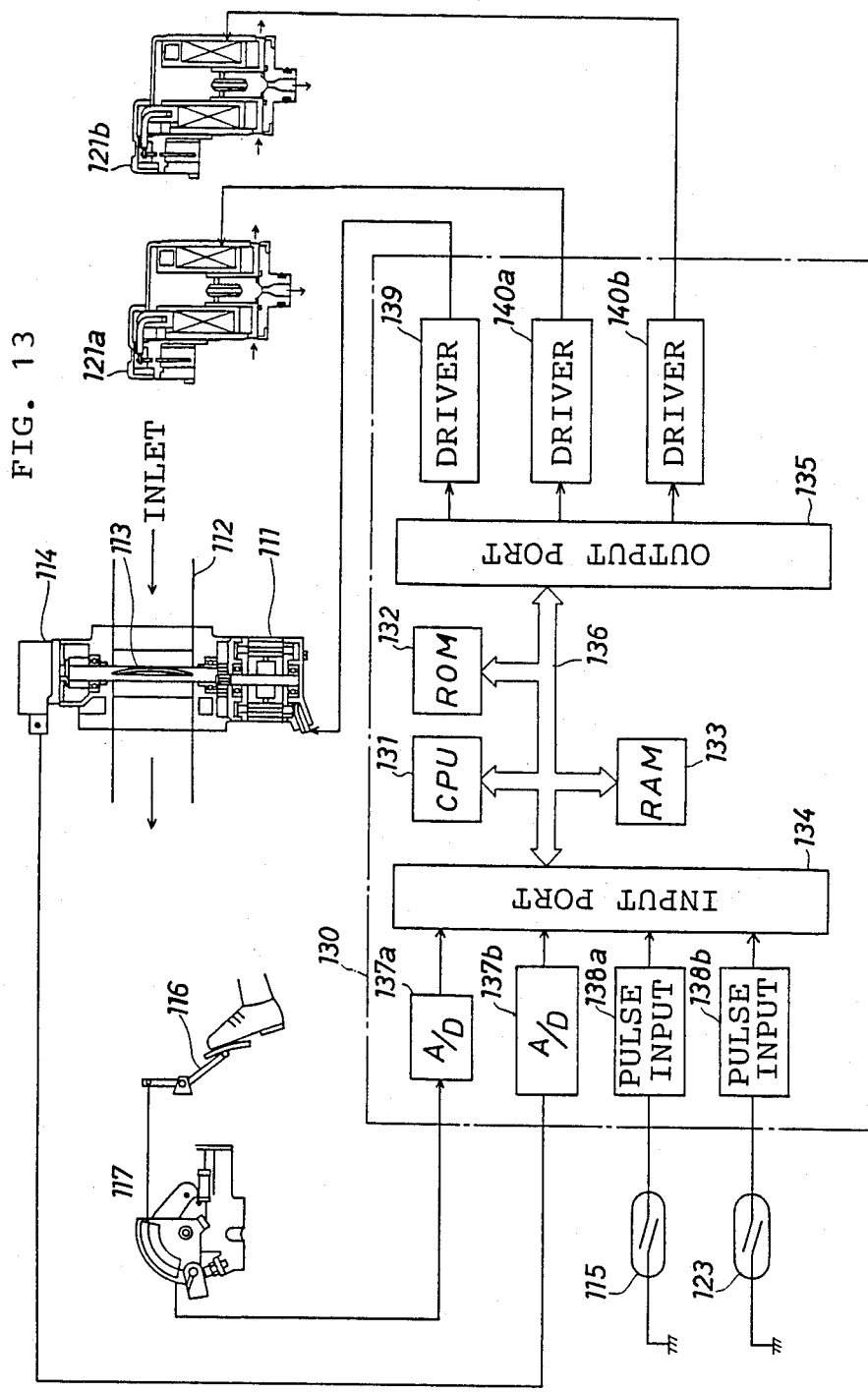
FIG. 13 is a block diagram showing the structure of the second embodiment.

A detailed explanation of the second embodiment will be described with reference to FIGS. 12 and 13. The construction illustrated in FIG. 12 is the same as that of the first embodiment, except for the lack of the slope sensor designated by numeral 24. As for the construction of a control circuit, it is also similar to that of the first embodiment.

Figure 14:
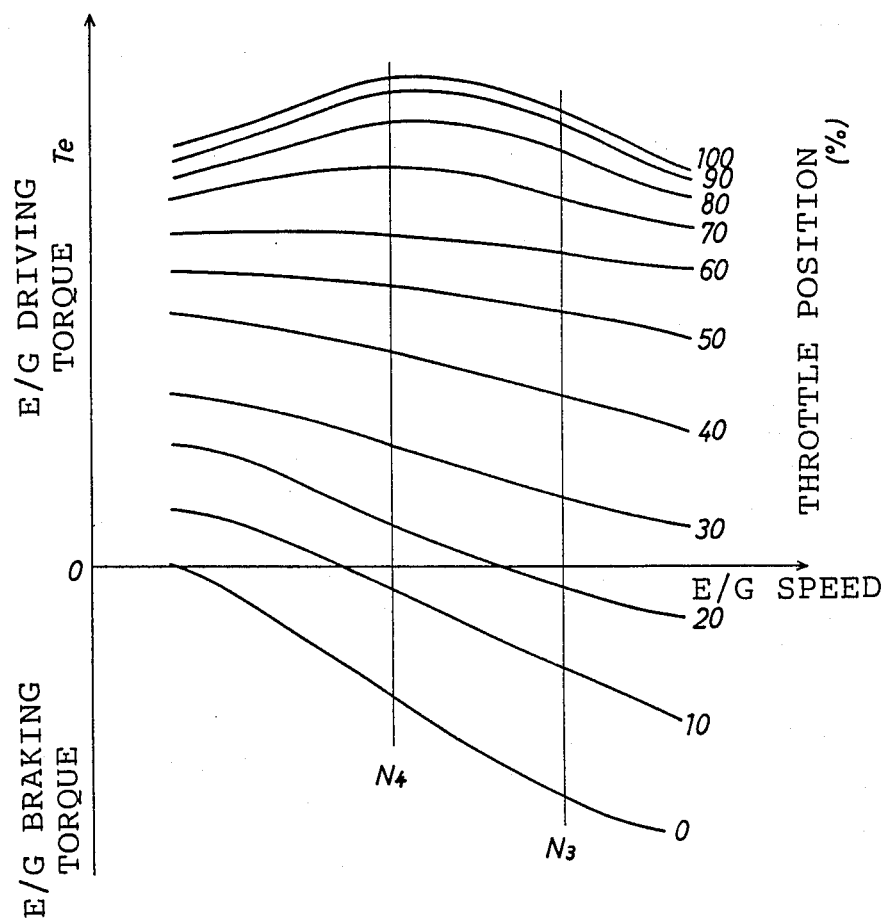
FIG. 14 is a graph showing an engine driving torque characteristic of the second embodiment.
Figure 15:
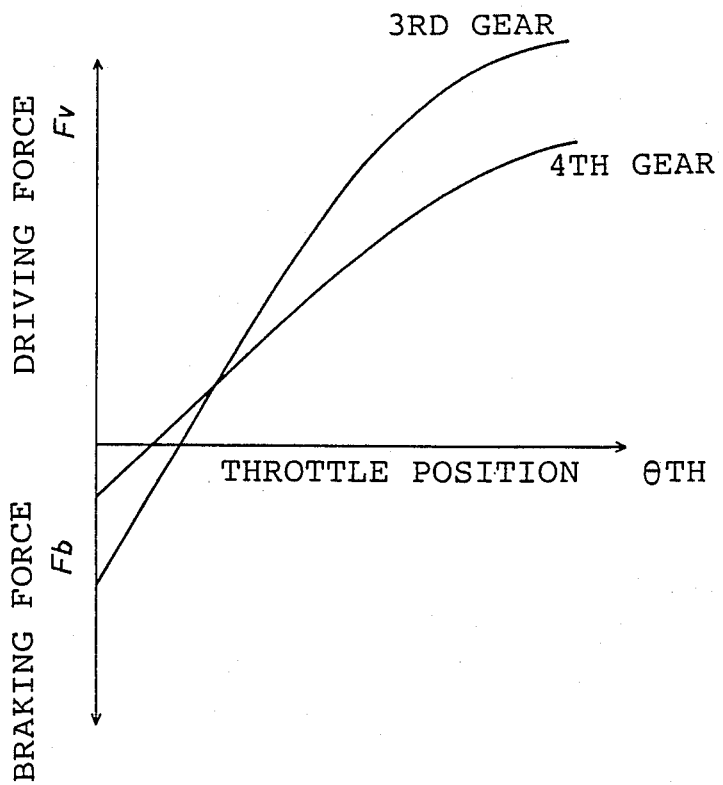
FIG. 15 is a graph showing a throttle opening characteristic of the second embodiment.

Within the ROM 32 of the micro computer, a graph shown in FIG. 14 is stored as a pattern for deriving an engine driving torque (braking torque) Te from the engine speed Ne and the throttle position theta-th. The engine driving torque and the engine braking torque stand for a driving force and a negative driving force (i.e., braking force), respectively, both of which are generated by the engine responding to the throttle position Set forth below is an explanation of curves in FIG. 15 used for controlling a driving force in the present embodiment. FIG. 15 represents curves illustrating relationships between a throttle position theta-th and a driving (braking) force Fv in accordance with operable gears, (i.e., fourth and third gears at a constant vehicle speed V) based on the relationship featured in FIG. 14. The braking force Fb is indicative of a negative driving force which is obtained in the present embodiment from the equation $Fb = -Fv$. Set forth below is an explanation of an example for obtaining the above curves, referring to FIG. 14. A line N4 in FIG. 14 stands for the engine speed at a predetermined vehicle speed, (i.e., 40 km/h), in fourth gear. A line N3 stands for the engine speed in third gear. The throttle position theta-th in any gear position G and the engine driving torque (engine braking torque) Te are obtained. Thus, the curves in FIG. 15 are derived from the following equation:

$$Fv = \{(Te \times R)/r\}(N)$$

where R and r represent a gear ratio and radius of a wheel, respectively. A position of a throttle valve 113 needed to adjust the driving force (braking force) Fv to a required value in a predetermined gear position G can be transmitted to a throttle actuator 111 with reference to the curve in FIG. 15 for controlling the throttle position theta-th hereinafter described.

Figure 16:
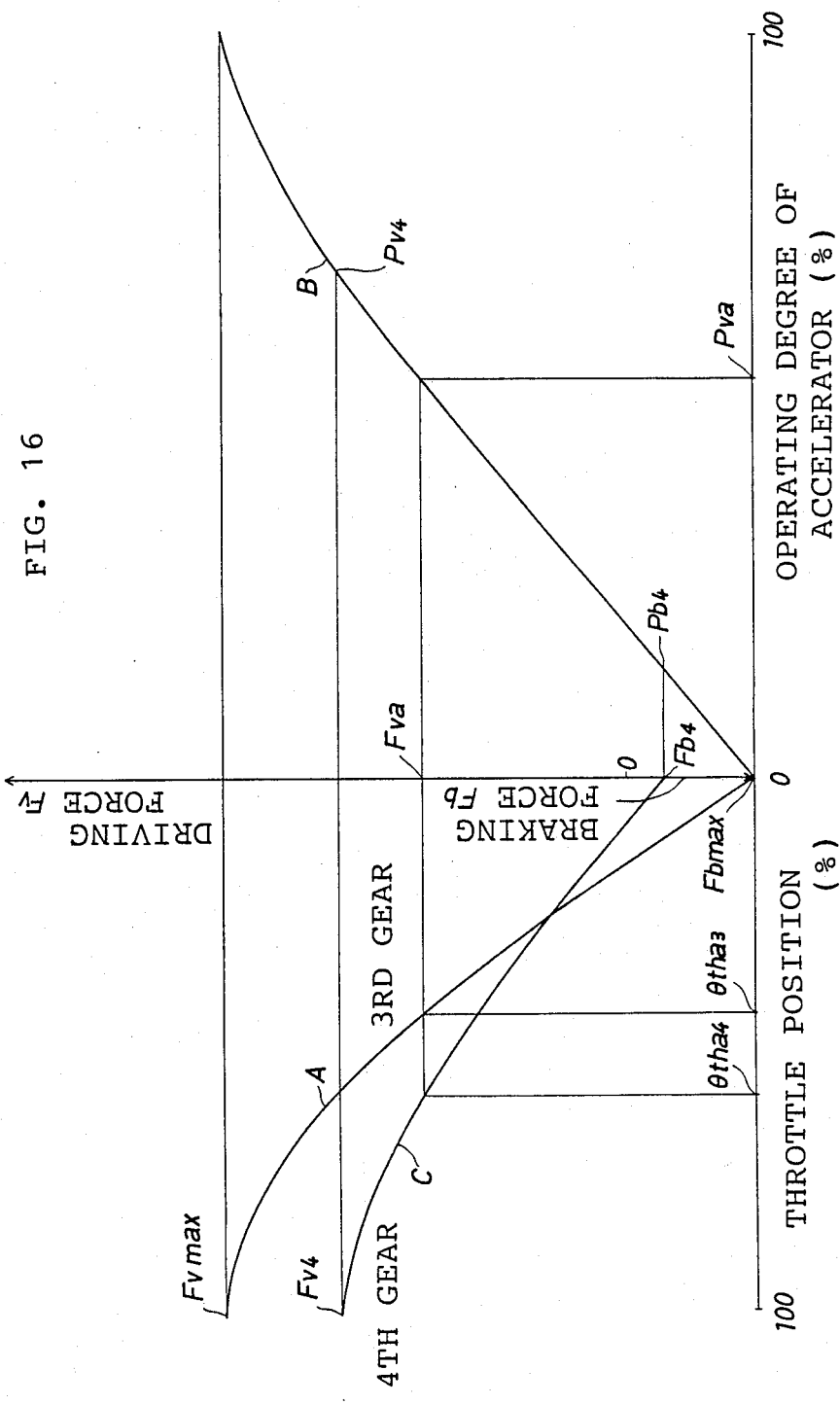
FIG. 16 is a graph showing a characteristic of an operation of the second embodiment.

A principle of the second embodiment according to the present invention will be described. In the present embodiment, the range from Fvmax, (i.e., a maximum driving force), to Fbmax, (i.e., a maximum braking force), is to be set in response to the operating degree of accelerator P% ranging from 0 to 100%. Both Fvmax and Fbmax are obtained in a gear position G which is operable at a current vehicle speed V. In case either third or fourth gear is operable at a current vehicle speed V as shown in FIG. 16, a curve A representing the range from Fvmax at the throttle position th, (i.e., 100%) to Fbmax at the throttle position theta-th, (i.e., 0%) in third gear is obtained, whereby a curve B in FIG. 16 indicative of the operating degree of accelerator P% is determined. Thus, a predetermined driving force or braking force is generated (in response to accelerator P%), both of which are included in the range from the maximum driving force Fvmax to the maximum braking force Fbmax generated by an engine 110 at the current vehicle speed V. A maximum driving force Fv4 and a maximum braking force Fb4 in fourth gear with a better fuel consumption ratio shown in a line C of FIG. 16 are included in the range from Fvmax to Fbmax. Within a range of an operating degree of an accelerator from Pb4 for generating the braking force Fb4 to Pv4 for generating the driving force Fv4, either third or fourth gear is selective. Whether upshifting or downshifting between third and fourth gear, the driving force or the braking force before gear changing is maintained throughout. Referring to FIG. 16, an example for obtaining the throttle position theta-th needed to coordinate the driving force Fv or the braking force Fb with the operating degree of accelerator P will be described.

In case an operating degree of accelerator P is set to a predetermined value Pva, the driving force Fv is determined as Fva with reference to a curve B. The throttle position in third gear in response to the driving force Fva is determined as theta-tha3 with reference to the curve A. A throttle valve position in fourth gear is determined as theta-tha4 with reference to a curve C.

Figure 17:
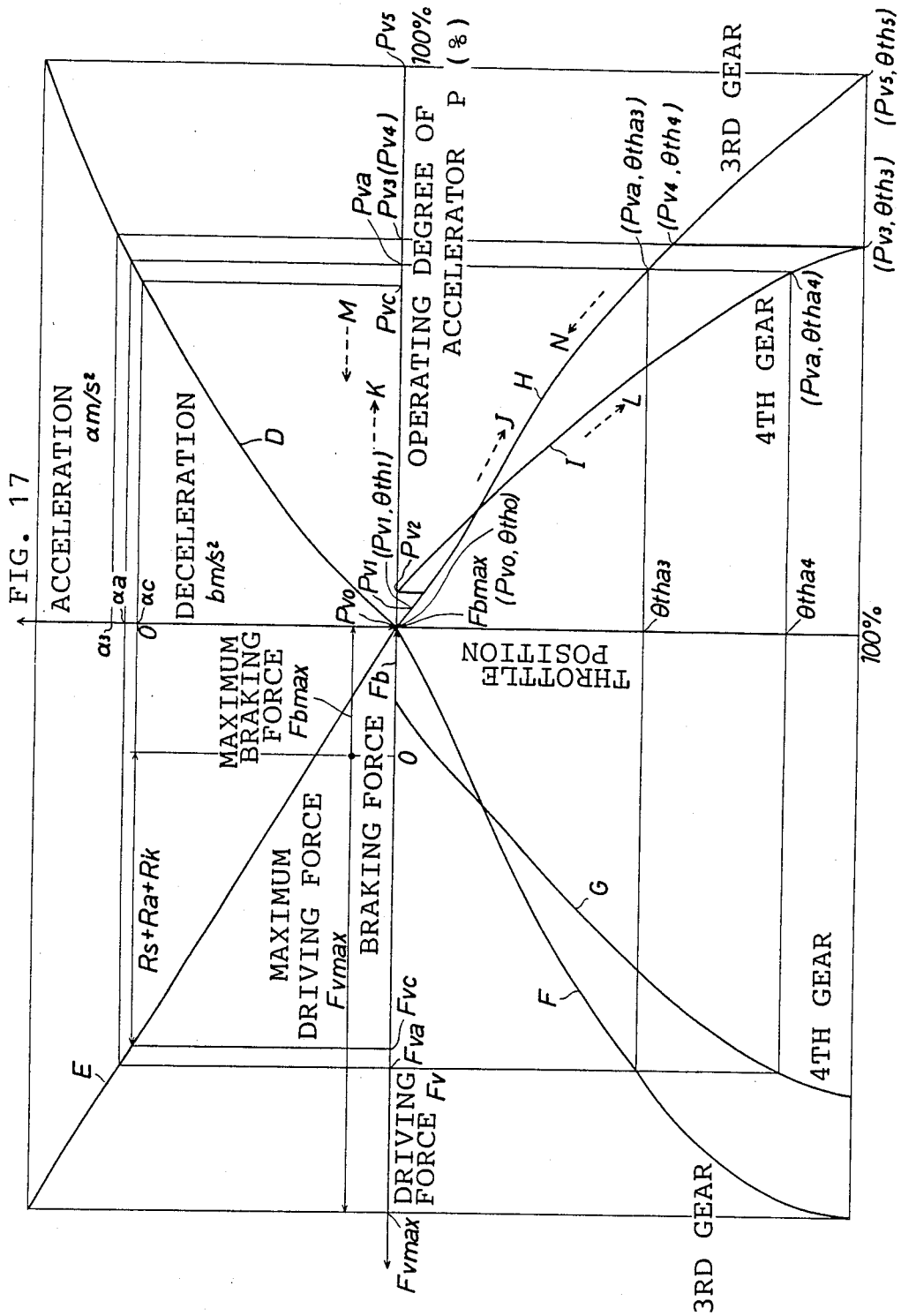
FIG. 17 is a graph showing one example of an operation of the second embodiment.

Set forth below is an example of the operation of the second embodiment according to the present invention referring to FIG. 17. In FIG. 17, a graph illustrates a relationship between an operating degree of accelerator P at a constant vehicle speed V, a gear position G, a driving force Fv, an acceleration alpha, and a throttle position theta-th at the respective gear position G. A curve D shows a relationship between an operating degree of accelerator at the current vehicle speed V and both acceleration alpha and deceleration b. A curve E shows a relationship between acceleration alpha and deceleration b, and a driving force Fv and a braking force Fb. A curve F shows a relationship between a driving force Fv and a braking force Fb in third gear and a throttle position theta-th. A curve G shows a relationship between a driving force Fv and a braking force Fb in fourth gear and with a throttle position theta-th. The curves H and I show the relationships between an operating degree of accelerator and a throttle positions in third and fourth gears, respectively.

The abscissa of the curve E stands for the region from the maximum driving force Fvmax to the maximum braking force Fbmax at a current vehicle speed shown in FIG. 16. The ordinate of the curve E stands for a range from the acceleration alpha to deceleration b corresponding to the respective driving force within the range from Fvmax to Fbmax. The acceleration alpha, is derived from the following equation:

$$alpha = \{(Fv - (Rs + Rk + Ra)\}/Wt$$

where Rs, Rk, Ra, and Wt represent a running resistance of a vehicle, a rolling resistance, an air resistance and a vehicle weight, respectively. The deceleration b is derived from the following equation:

$$b = \{Fb - (Rs + Rk + Ra)\}/Wt$$

In case the acceleration equals zero, (i.e., the driving force Fv equals the sum of Rs, Rk and Ra), the operating degree of accelerator, the acceleration and the driving force are determined as Pvc, alpha-c and Fvc, respectively with reference to the curves D and E in FIG. 17. In case that an operating degree of accelerator P is set to a predetermined value Pva, the corresponding acceleration alpha-a, driving force Fva, and throttle positions theta-tha3 and theta-tha4 in third and fourth gears are determined with reference to the graph in FIG. 17.

Figure 18:
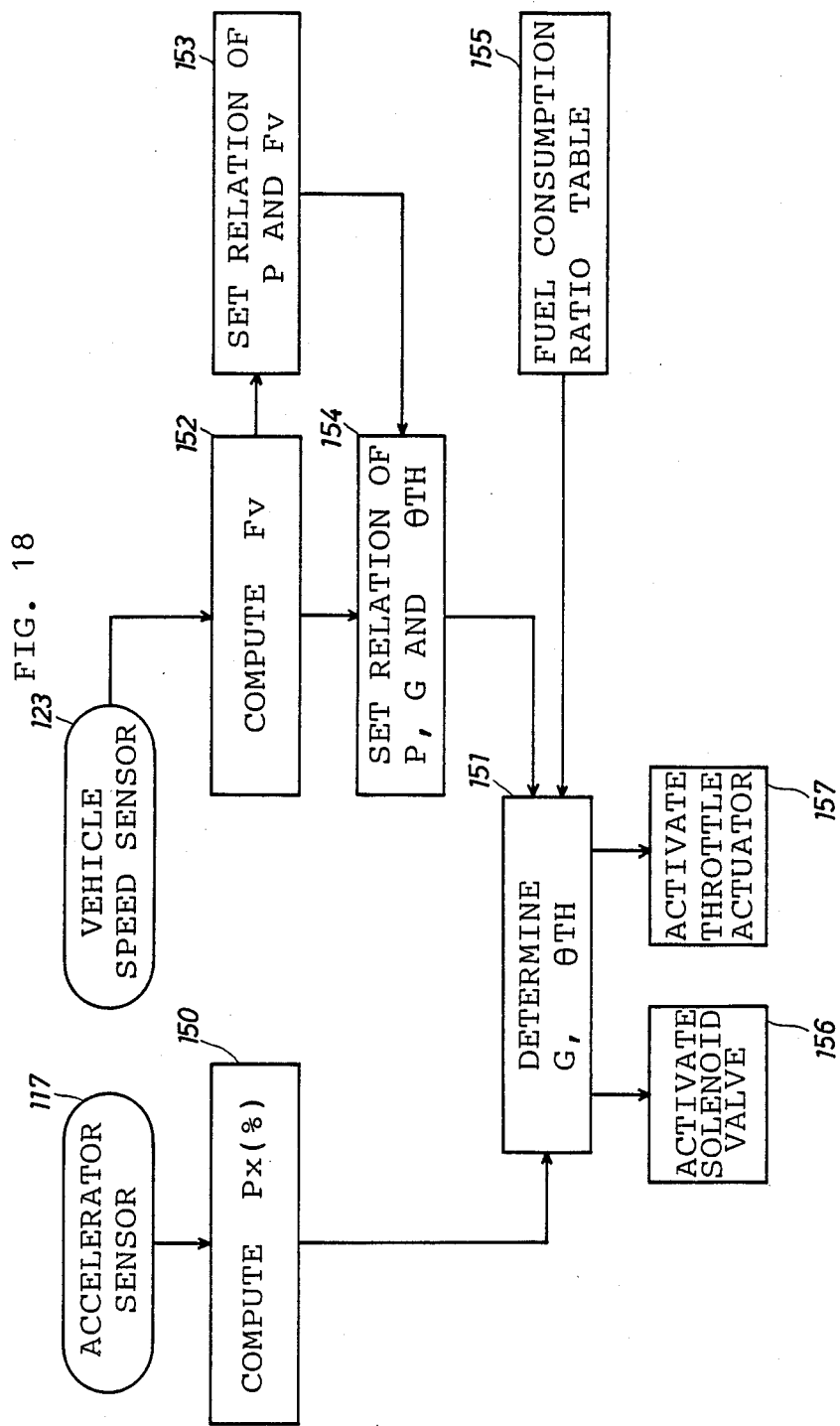
FIG. 18 is a block diagram showing the principle of the second embodiment.

The logic of the second embodiment according to the present invention will be described with reference to FIG. 18. A current operating degree of accelerator Px (%) is detected by an accelerator sensor 117 at step 150. Then, the value Px is transmitted to step 151 described hereinafter, whereby a gear position and a throttle position are determined. At step 152, based on the data detected by a vehicle speed sensor 123, a driving force Fv in an operable gear position G at a current vehicle speed V is computed with reference to a graph in FIG. 14. At step 153, a respective driving force Fv coordinated with the operating degree of accelerator P is determined over a range from Fvmax to Fbmax as shown in FIG. 16. At step 154, a relationship between the driving force Fv and the operating degree of accelerator P is set based on the steps 152 and 153 shown in FIG. 16. Consequently, the step 154 sets a relationship between an operating degree of accelerator P, a gear position G and a throttle position theta-th thereat. At the step 151, a gear position G yielding the best fuel consumption ratio is selected based on the relationship set at step 154, on the detected degree Px, and on a graph of fuel consumption ratio 155 (not shown), thereby providing a throttle position theta-th in the selected gear. In the aforementioned graph of the fuel consumption ratio 155, generally, the highest gear which is currently operable is indicated to yield a best fuel consumption ratio. The appropriate gear position G is output to the step 156 where solenoid valves 121a and 121b are activated. Simultaneously, the throttle position theta-th obtained at the step 151 is output to step 157 where the throttle actuator 111 is activated.

An example of adjustment to an operating degree of accelerator Px at a predetermined vehicle speed V, (i.e., 40 km/h), will be described with reference to FIG. 18 and the graph in FIG. 17. In case an operating degree of accelerator Px equals zero,( i.e., Pv0), at step 150, with an accelerator pedal 116 released from an operating degree Pvc, it is determined at step 153 that a maximum braking force Fbmax is required. At steps 151, 154, 156 and 157, third gear is selected and a throttle position theta-th is adjusted to zero,(i.e., theta-th0). The point having the coordinate (Pv0, theta-th0) in FIG. 17 corresponds to the above condition. In case the operating degree Px increases in the direction of an arrow K to Pv1 at the step 150, a throttle position theta-th is adjusted to increase in the direction of an arrow J taken on a curve H to the point with the coordinate (Pv1, theta-th1), since the throttle position theta-th is only derived for third gear as the curve H shows. In case the operating degree of accelerator Px is further increased to the point Pv2 in the direction of the arrow K, each throttle position theta-th corresponding to the gear positions G in both third and fourth gears is obtained by the curves I and H. Thus, at the point Pv2, either third or fourth gear is operable. Generally, fourth gear is selected at the step 151 in accordance with the fuel consumption ratio graph because of better fuel consumption ratio. Then, from the point Pv2, the gear is shifted to fourth gear, and a throttle position is adjusted to zero as the curve I shows. When the operating degree of accelerator is increased in the direction of the arrow K, the throttle position is increased in the direction of an arrow L on the curve I. When the Px increases to a point Pv3, since the throttle position theta-th in fourth gear reaches 100% as shown in the curve I, the gear position G and the throttle position theta-th are changed to third gear and th4, respectively as a point with the coordinate (Pv4, theta-th4) on the curve H (step 154 and 151). Then, an accelerator operating degree P increases to 100% at the point Pv5 in the direction of the arrow K, the throttle position is also increased to reach 100% on the curve H in the direction of the arrow J, resulting in the point with the coordinates (Pv5, theta-th5). Accordingly, in the above state, a maximum driving force Fvmax at a current vehicle speed V is generated. Under the above control, the accelerator operating degree Px is decreased from Pvc at the normal vehicle speed and further to Pv0(0%) with maximum deceleration. Then, the operating degree of accelerator Px is increased to Pv5 (100%) in the direction of the arrow K.

Figure 19:
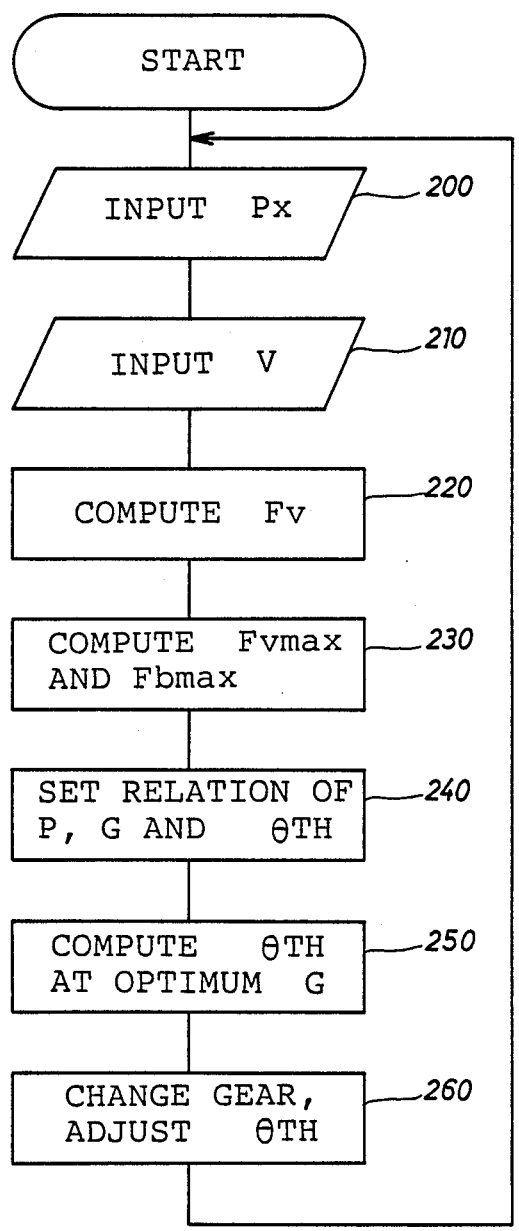
FIG. 19 is a flow chart showing the program of a vehicle driving power control by the second embodiment.

In case of upshifting from third t fourth gear at the power Pv3, the operating degree Px is decreased in the direction of an arrow M and the throttle position is adjusted on the curve H in the direction of an arrow N as predetermined for execution at the step 151. The hysteresis is set between the points of upshifting and downshifting from third to fourth or vice versa, so that the operating degree Px is maintained in the vicinity of Pv3 (Pv4) to prevent frequent gear changing. A flow chart for establishing the above mentioned operation and logic will be explained with reference to FIG. 19. At steps 200 and 210, a current operating degree Px and vehicle speed V are input. Then, at step 220, a driving force Fv or braking force Fb in an operable gear position G is obtained based on the vehicle speed V. Then the program proceeds to step 230 where the respective maximum value of positive and negative driving forces Fv, (i.e., maximum driving force Fvmax and maximum braking force Fbmax), are computed At step 240, each value in the range from Fvmax to Fbmax is corresponded with the respective operating degree of accelerator P, and the driving force F is corresponded with the throttle position theta-th at each gear position G, resulting in the graph shown in FIG. 16. Thus, a relationship among the driving force F, operating degree of accelerator P, and throttle position theta-th is obtained at the step 240. The program proceeds to step 250 where the optimum gear position G corresponding to the current operating degree of accelerator Px input at the step 200, (i.e., the ear position G for yielding the best fuel consumption ratio), is determined and the throttle position theta-th thereat is computed. The program then proceeds to step 260 where the gear is changed and the throttle position is adjusted.

In the second embodiment of the present invention, a respective value ranging from Fvmax to Fbmax at the current vehicle speed V is corresponded with each operating degree of accelerator Px. In case of either upshifting or downshifting, the throttle position theta-th is controlled so as to maintain the driving force Fv throughout the shift, thereby minimizing shock caused by the gear changing. Since a driving force Fv, acceleration alpha, and deceleration b are derived from the graph for representing the relationship thereof, frequent gear changing due to lack of maintaining consistent driving force through acceleration or deceleration is prevented.

The construction of a third embodiment according to the present invention includes an automatic transmission for transmitting an engine power to a driving wheel via a plurality of gears. The automatic transmission control is executed to minimize change of the driving power caused by gear changing. The engine power is controlled by a second throttle valve 213 provided in an intake passage and mounted serially to a first throttle valve 207 coordinated with an accelerating pedal 206.

Figure 20:
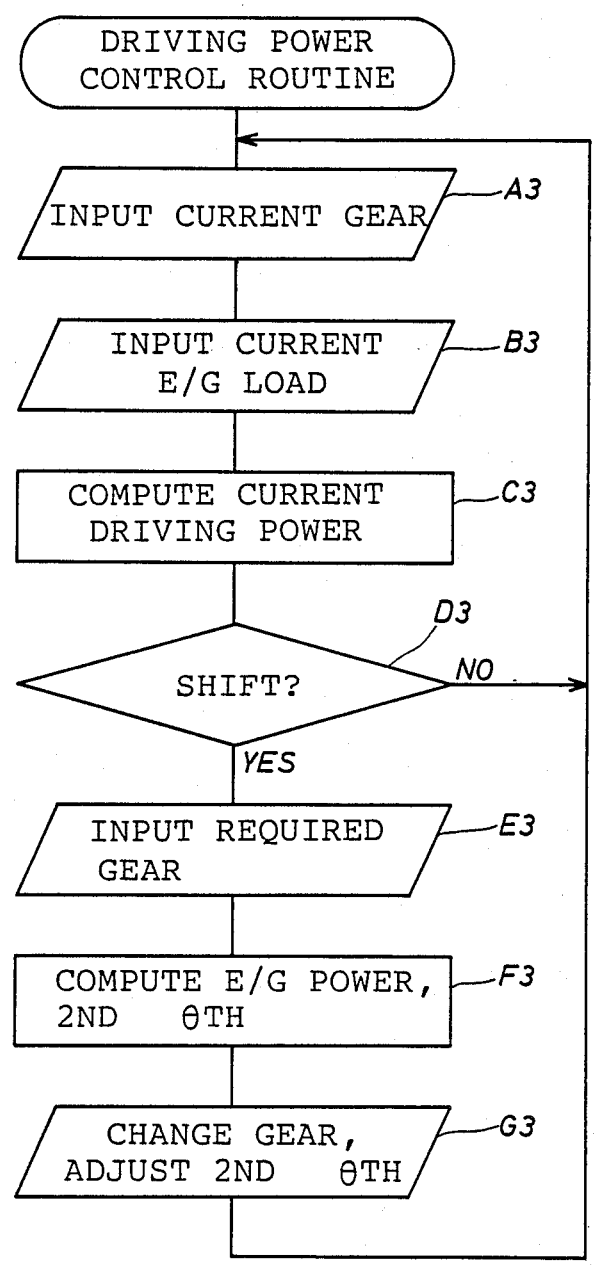
FIG. 20 is a flow chart showing the structure of a third embodiment of the present invention.

Referring to FIG. 20, a current gear position and a current engine load are input (steps A3 and B3) to compute the current driving force of a vehicle (step C3). In case a shifting gear is required (step D3), a driving force at the required gear position is input (step E3). Then, an engine power to be maintained at the required gear position along with the second throttle valve position are computed, thereby adjusting engine power to the computed value (step F3). A gear is shifted to the required one along with adjusting a position of the second throttle valve 213 to a computed value (step G3). The gear position, the engine load, and driving force are detected by the same manner as those of the first embodiment. Engine power is controlled to maintain the estimated driving force of the vehicle throughout the gear changing in accordance with the value obtained by coordinating the engine power with gear ratio. For example, the engine power is controlled by adjusting the position of the second throttle valve 213 which controls an intake air amount, which might be combined with controls for varying an ignition timing, fuel injection amount and the like. The data detected by a torque sensor (not shown), or computed from the engine speed and the intake air amount are used to determine the value of the engine power.

In the third embodiment, engine power is controlled by adjusting the position of the second throttle valve 213 so that the difference of the driving force between gear change is reduced. Accordingly, the engine power is controlled in accordance with the engine load and the gear ratios throughout gear changing to prevent a sharp rise or drop in acceleration, thereby minimizing the shock due to the upshifting or downshifting, thus providing smoother acceleration.

Figure 21:
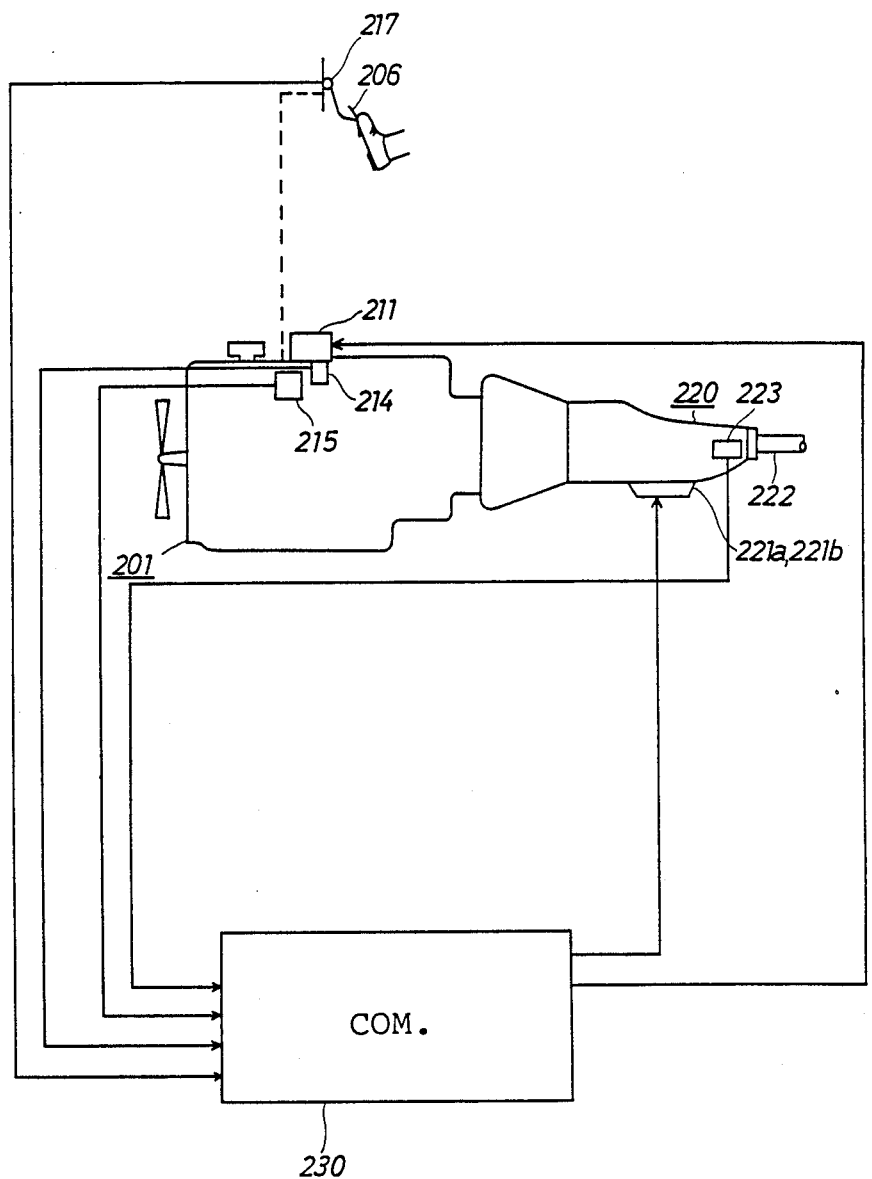
FIGS. 21 and 22 are block diagrams showing the structure of the third embodiment.
Figure 22:
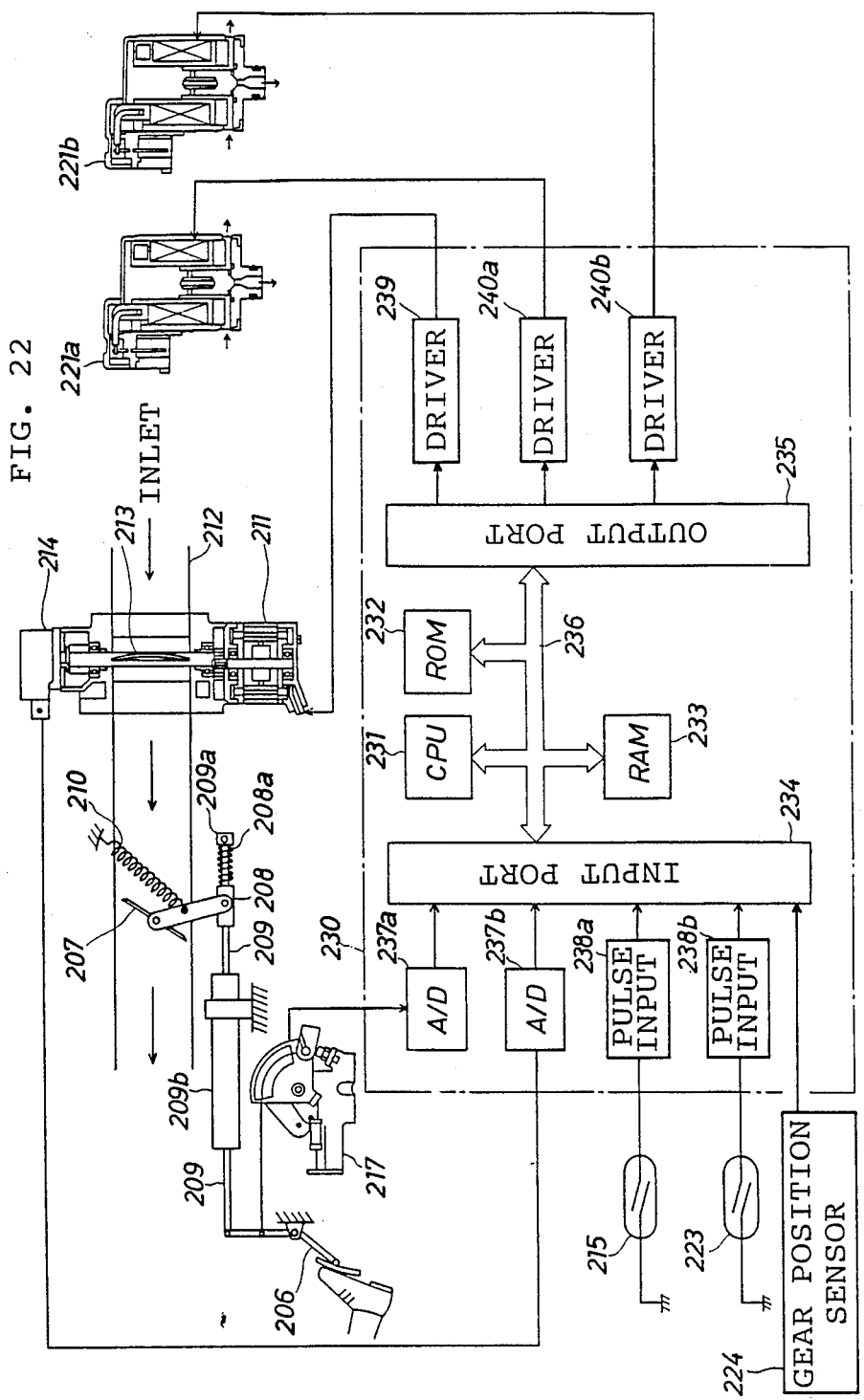

Detailed description of the third embodiment according to the present invention will be described with reference to FIGS. 21 and 22. An engine 201 controls its power by adjusting the second throttle valve 213 via a throttle actuator 211 and the first throttle valve 207 which is provided with an intake tube 202 and connected to the accelerator pedal 206. The first throttle valve 207 is connected to a cable 209 via the accelerator pedal 206 and a link 208 and is kept closed by a return spring 210. The link 208 is connected to a cable end 209a via a spring 208a. The cable 209 is inserted through a cable tube 209b which is fixed to the engine 201. The accelerator pedal 206 is coordinated with the first throttle valve 207 so that a position of the valve 207 is adjusted in accordance with the increase in the operating degree of accelerator up to 80%. When the operating degree of the pedal 206 is further increased to exceed 80%, the position of the throttle valve 207 reaches 100%, then only the accelerator pedal 206 is operated. Thus, the first throttle valve 207 controls the engine 201 in case the second throttle valve 213 is in abnormal condition. The second throttle valve 213 is kept open by a spring (not shown). In case the trouble occurs in the throttle actuator 211 or the like which controls the second throttle valve 213, it is to be fully opened. Under the above condition, the power from the engine 201 is controlled only by the first throttle valve 207. The automatic transmission 220 enables two solenoids 221a and 221b to perform four-stage-shifting. The throttle actuator 211 and the solenoids both 221a and 221b are driven by a signal output from a control circuit 230 which inputs signals from sensors attached to the respective part within the vehicle including the engine 201 and the automatic transmission 220.

A throttle position sensor 214 detects a position of the second throttle valve 213 arranged within the intake valve 202 provided for the engine 201. An engine speed sensor 215 detects an engine speed. An acceleration sensor 217 detects an operating degree of the accelerator pedal 206. A vehicle speed sensor 223 detects a rotational degree of an output shaft 222 of the automatic transmission which is proportional to a vehicle speed. A gear position sensor 224 detects a gear position G. Operations of those sensors and construction of the above control circuit 230 are similar to those of the first and the second embodiment, which can be omitted. As for the inside of the ROM 32 of the micro computer, a throttle position relationship is stored shown in FIG. 14 as a pattern for deriving an engine driving torque (braking torque) Te from an engine speed Ne and a throttle valve position theta-th. The engine driving torque Te and braking torque stand for positive and negative driving force, (i.e., braking force) as generated by the engine 201 responding the throttle position.

A characteristic curves showing the driving power control in the third embodiment are similar to those of FIGS. 14 and 15 in the second embodiment, which are omitted.

Figure 23:
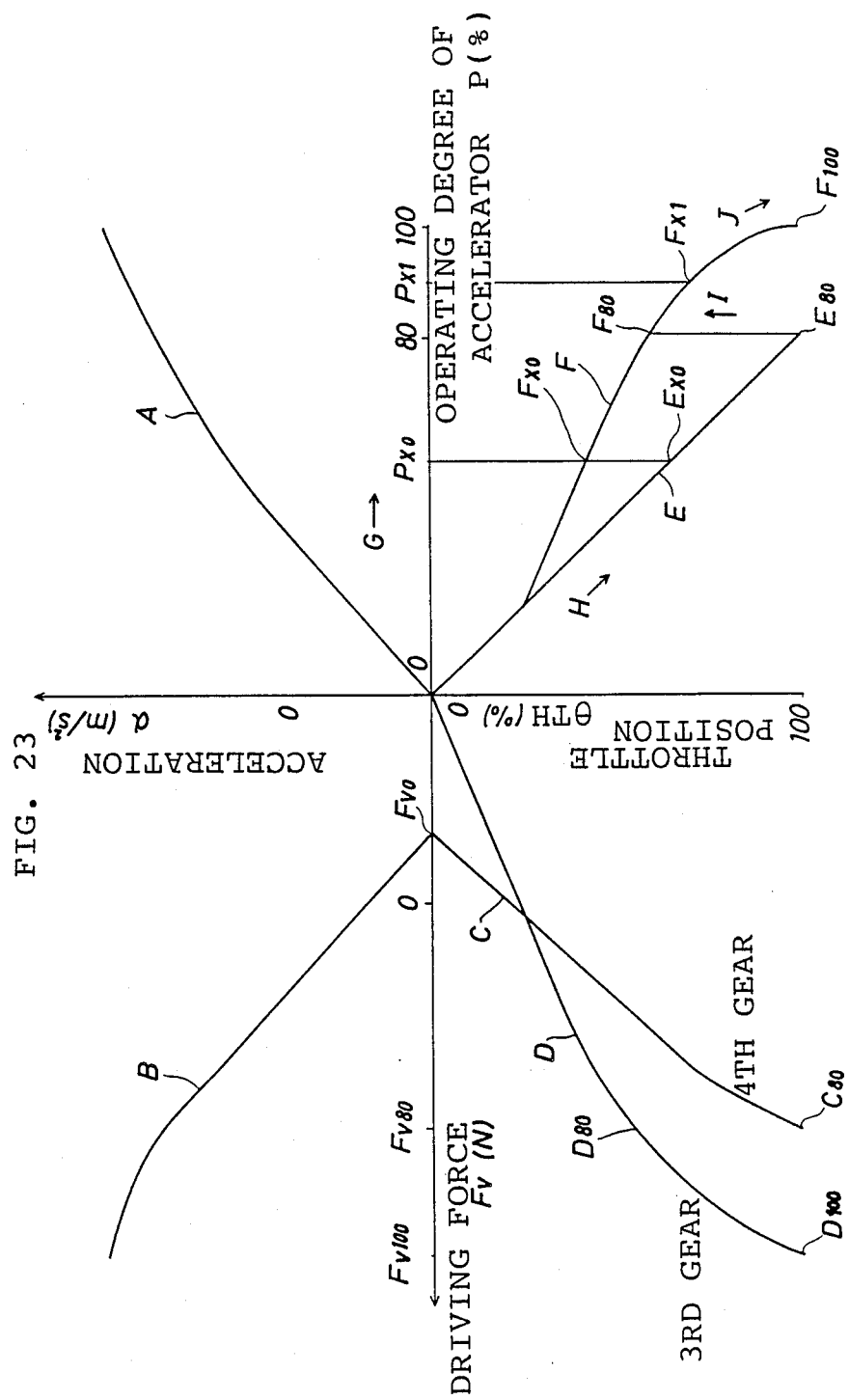
FIG. 23 is graph showing a characteristic of an operation of the third embodiment.

A principle of the control according to the present embodiment will be described. A gear position and a position of the throttle valve 213 are determined according to a driving force Fv with the valve position 100%, (i.e., fully opened) at the highest gear position G which is operable at a current vehicle speed. By maintaining the driving force Fv throughout gear changing, optimum control for driving force is obtained. An example for establishing the above control will be described with reference to FIG. 23. A relationship among an operating degree of accelerator P at a constant vehicle speed V, a gear position G, a driving force Fv, an acceleration alpha, and a throttle position theta-th is illustrated in FIG. 23. A curve A shows a relationship between the operating degree of accelerator P at the current vehicle speed V and the acceleration alpha. A curve B shows a relationship between the acceleration alpha and the driving force Fv. A curve C shows the relationship between the driving force Fv in fourth gear and the throttle position theta-th. A curve D shows a relationship between the driving force Fv in third gear and the throttle opening theta-th A curve E represents a relationship between the operating degree of accelerator P and a position of the first throttle valve 207. A curve F represents a relationship between an operating degree of accelerator P and a position of the second throttle valve 213. Referring to FIG. 23, an example of the above-mentioned control will be described. In case an operating degree of accelerator P is increased from 0% to 80% in the direction of an arrow G by depressing an accelerator pedal 206 in fourth gear at a current vehicle speed V, the second throttle valve 213 is fully opened and a position of the first throttle valve 207 is increased on the line E from 0% to 100% in the direction of an arrow H. The operating degree of the accelerator P is further increased from 80% to 100% to upshift from third to fourth gear, and the second throttle valve 213 is adjusted in the direction of an arrow I, increasing the throttle position to 100% on the curve F in the direction of an arrow J. The driving force Fv is kept constant throughout gear changing from fourth to third by the above-mentioned operation. In case that an operating degree of accelerator P equals 0%, 80% and 100%, the respective driving force corresponding thereto are generated as Fv0, Fv80, and Fv100. The above curve B illustrates a characteristic of an acceleration alpha in case the driving force within the range from Fv0 to Fv100 is exerted to the vehicle. The acceleration alpha is derived from the following equation:

$$alpha=(Fv-(Rs+Rk+Ra))/Wt$$

where it is similar to those in the first and the second embodiments. Referring to FIG. 23, in accordance with an operating degree of accelerator P, the line E and the curve F, the second throttle valve 213 is fully opened with the operating degree of accelerator Px0 in fourth gear since the corresponding throttle position is determined to be Ex0. In case of third gear, the position of the second throttle valve 213 is adjusted to Fx0. If the current operating degree of accelerator Px equals Px1 which exceeds 80%, the value of gear and the position of the second throttle valve 213 are determined to be third gear and Fx1, respectively.

Figure 24A:
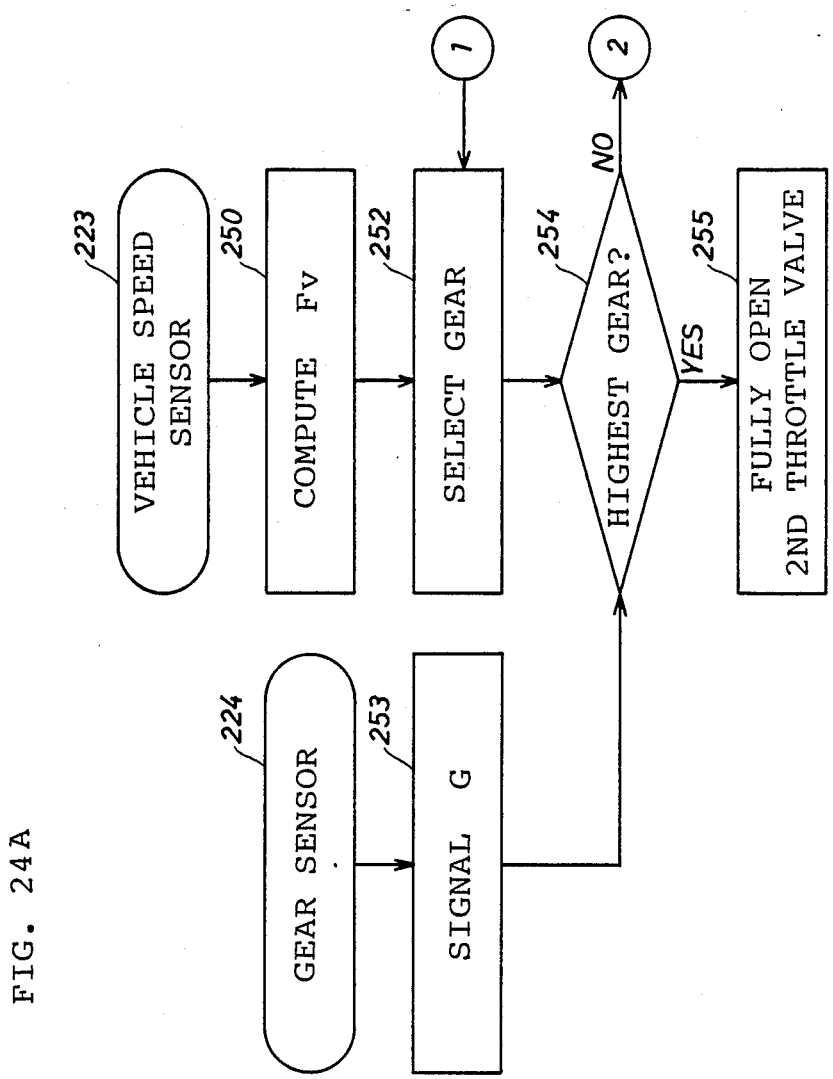
FIGS. 24A-24B are block diagrams showing the principle of the third embodiment.
Figure 24B:
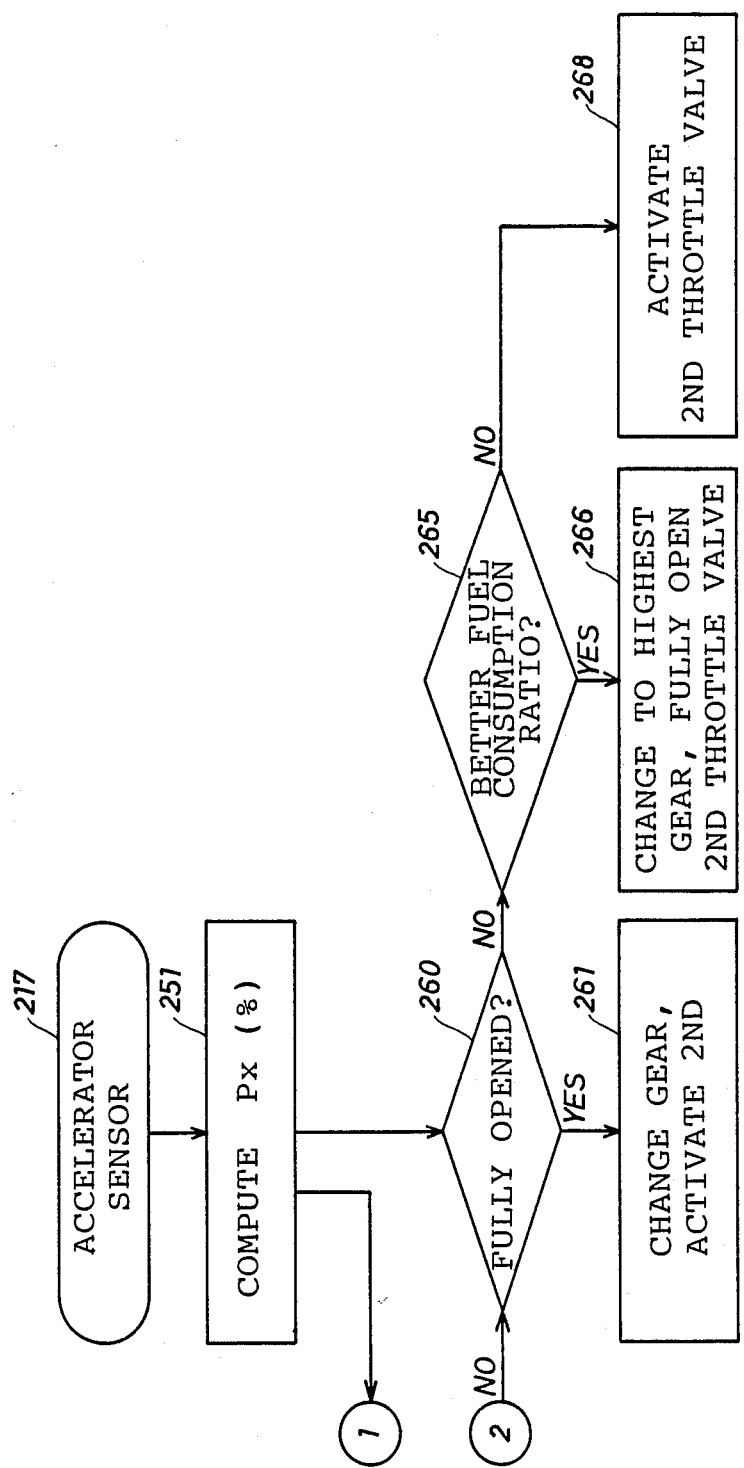

Referring to FIG. 23 and the controlling logic of FIG. 24, the control executed in the present embodiment will be described. In FIGS. 24A and 24B, the driving force Fv in third and fourth gear corresponding to each throttle position is derived with reference to FIG. 14 in the second embodiment, based on a vehicle speed V as detected by the vehicle speed sensor 223

(step 250). Thus, both curves C and D in FIG. 23 are obtained.

A current operating degree of accelerator Px(%) is then computed based on the data output from the accelerator sensor 217 (step 251). An operable current gear position is determined by the operating degree of accelerator Px and the above-mentioned relationship between driving force Fv and the throttle position (step 252). Namely, in case an operating degree of accelerator Px in FIG. 23 equals Pxo, either third or fourth gear is selective, since both curves E and F apply. In case the operating degree equals Px1, only curve F is selective, resulting in third gear.

A determination is made whether a current gear position is the highest in response to the above selected gear position and a gear position signal output from a gear position sensor 224 (step 254). If the current gear position is the highest, the engine power is controlled only by the first throttle valve 207. The second throttle valve 213 is kept fully opened (step 255). In case the current gear position is not the highest, it is determined whether or not the first throttle valve 207 is fully opened, (i.e., an operating degree of accelerator Px exceeds 80%) (step 260).

If the first throttle valve 207 is fully opened, a gear position corresponding to the current operating degree of accelerator Px is determined and the second throttle valve 213 is activated (step 261). Accordingly, in case the operating degree Px equals Px1 in FIG. 23, third gear is selected and the position of the second throttle valve 213 is adjusted to Fx1.

Figure 25A:
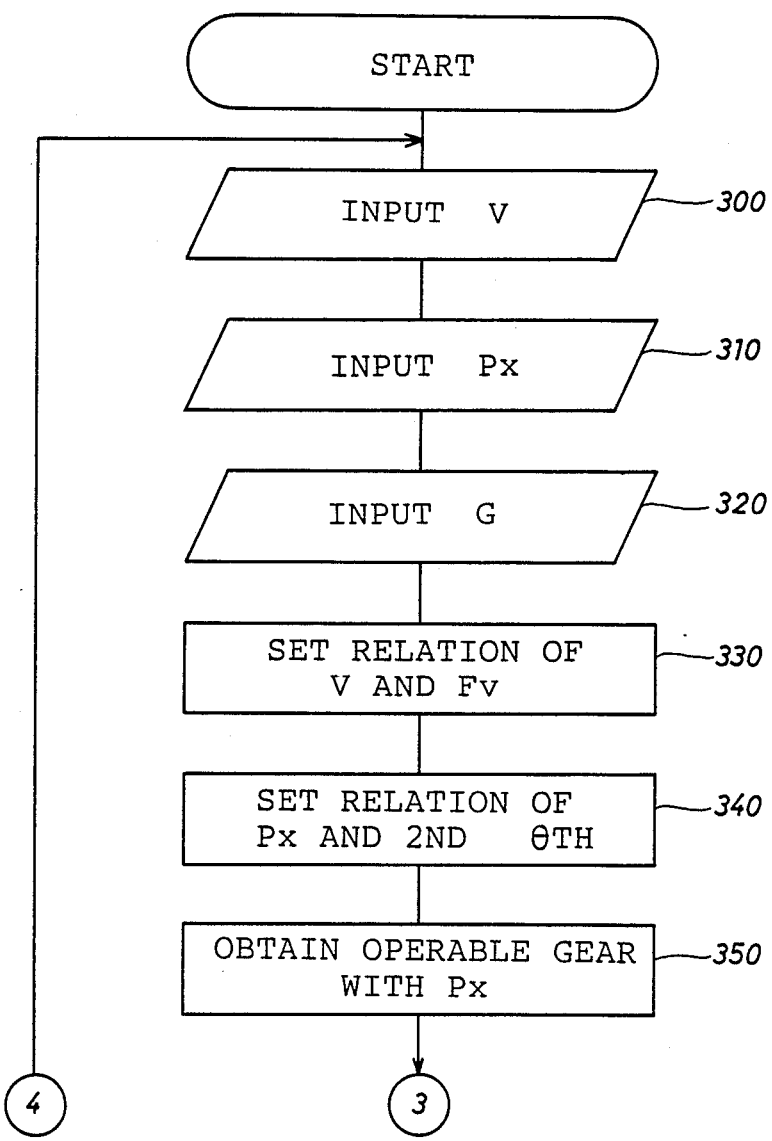
FIGS. 25A-25B are flow charts showing the program of a vehicle driving power control by the third embodiment.
Figure 25:
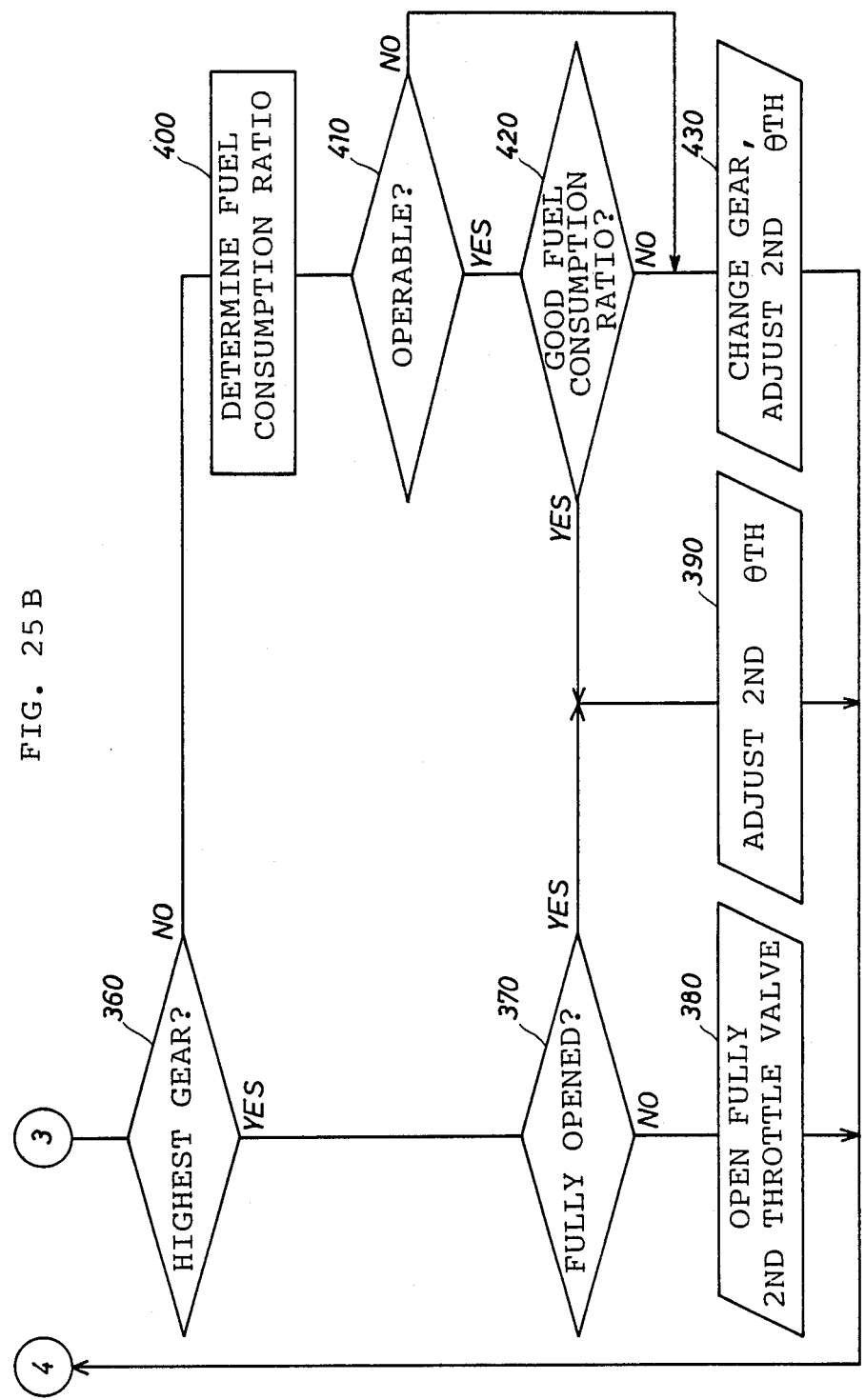
Figure 26:
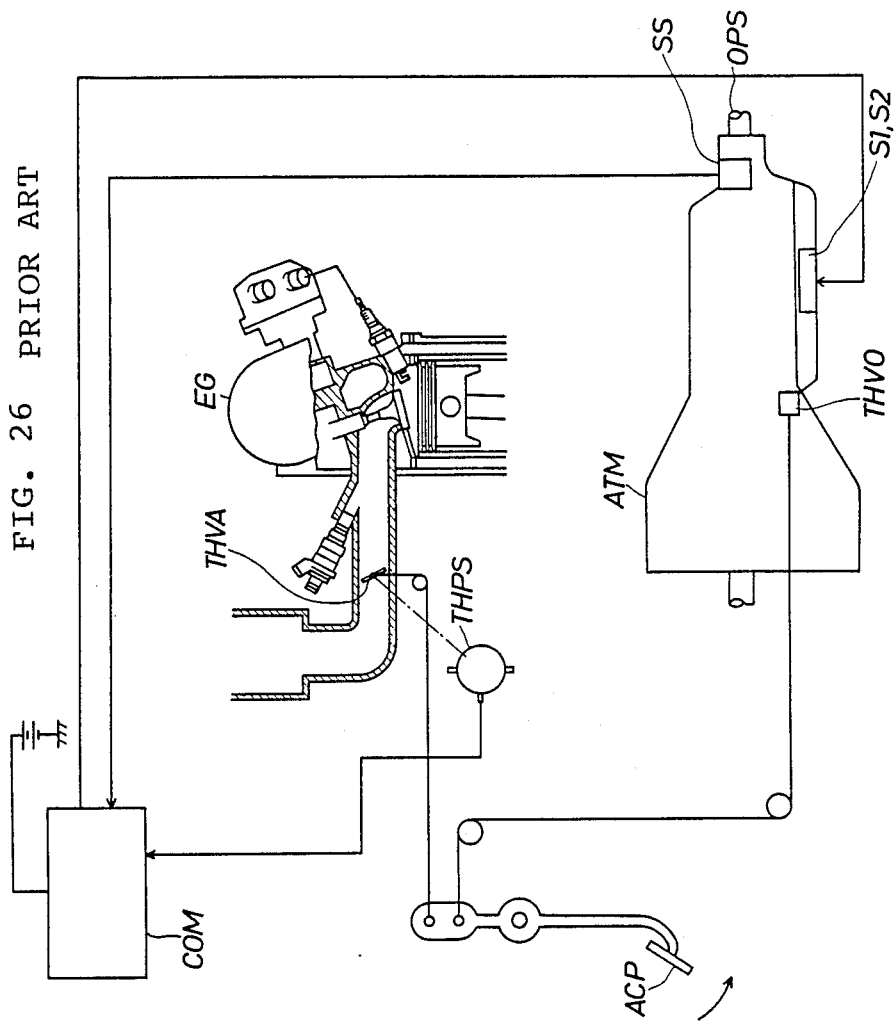
FIG. 26 is a system diagram of a prior art.
Figure 27:
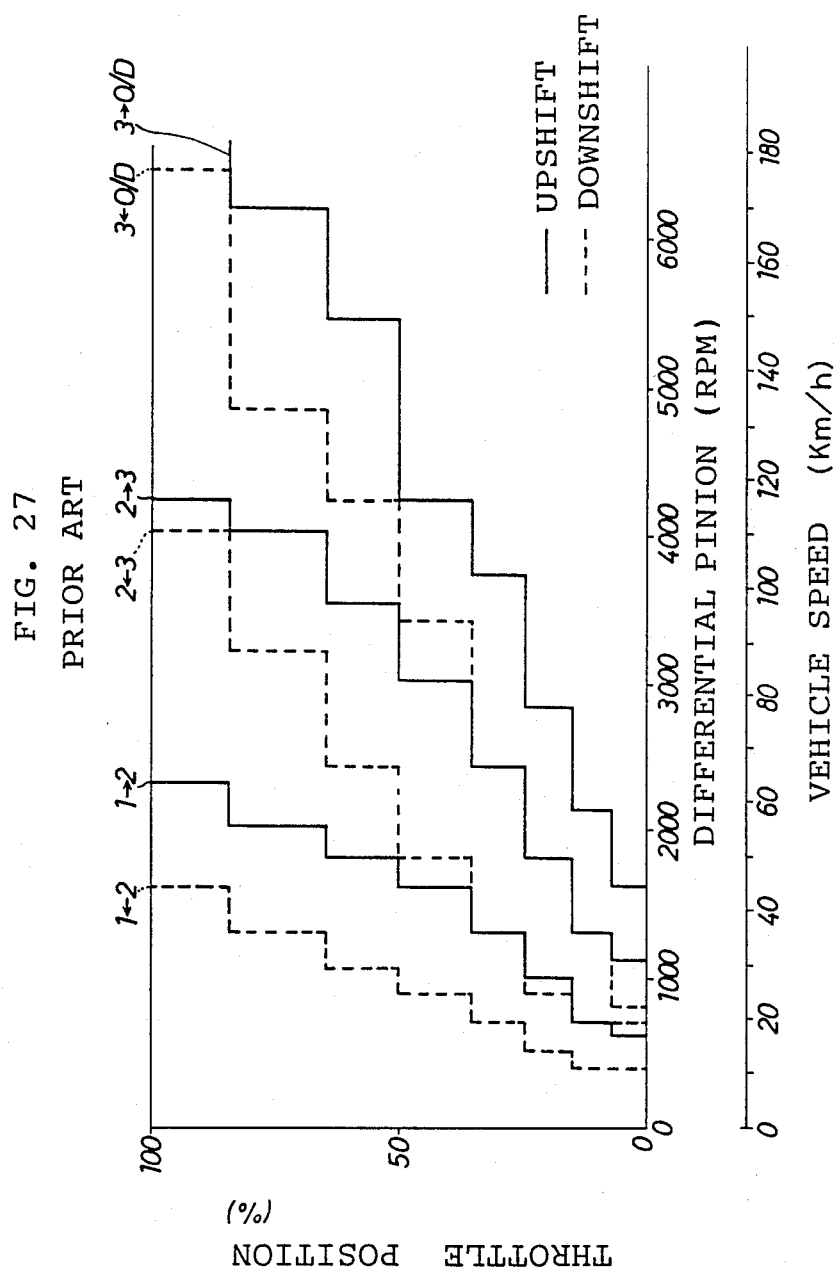
FIG. 27 is a graph showing a shifting pattern of the prior art.
Figure 28:
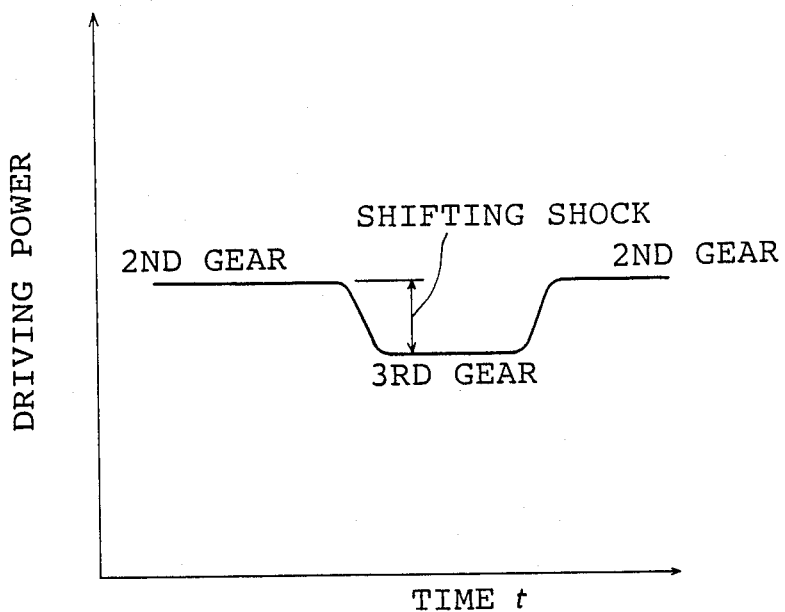
FIG. 28 is a graph showing a shifting pattern of the prior art.
Figure 29:
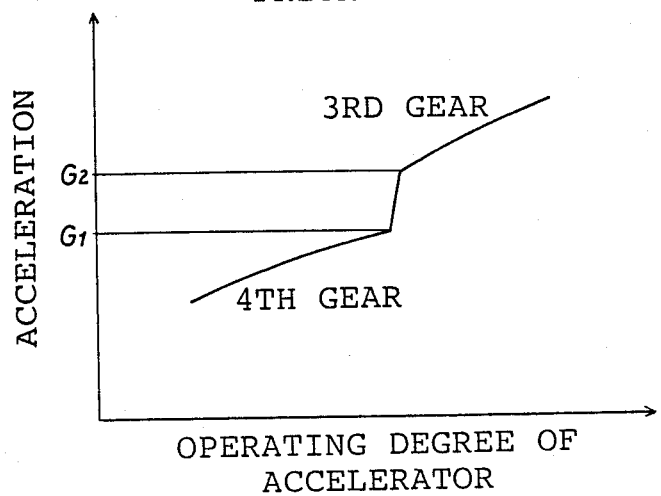
FIG. 29 is a graph showing an acceleration characteristic of the prior art in the case of a shift.

When the first throttle valve 207 is not fully opened, it is determined whether or not the highest gear yields better fuel consumption ratio than other operable gears (step 265). The above determination is made based on a fuel consumption ratio graph (not shown). If it is determined that the highest gear yields a better fuel consumption ratio, a gear is changed to the highest one and the second throttle valve 213 is activated to be fully opened (step 266). If it is determined that the difference of fuel consumption ratios between the current gear position and the highest one is negligible, the current gear position is maintained and a position of the second throttle valve 213 is adjusted (step 268). Thus, unless the fuel consumption ratio is an influential factor, the current gear position is maintained, instead of changing to the highest gear, in order to prevent frequent shifting. In accordance with the controlling logic shown in FIGS. 24A and 24B, a driving force Fv is kept constant throughout gear changing by adjusting the position of the second throttle valve 213, thereby minimizing the shock. FIGS. 25A and 25B are flow charts illustrating above-mentioned control executed by the control circuit 230.

A vehicle speed V, an operating degree of accelerator Px, and a gear position G are input at steps 300, 310 and 320, respectively. At step 330, a relationship between the driving force Fv and the throttle position theta-th at a current vehicle speed V is obtained, corresponding to the curves C and D in FIG. 23.

At step 340, a relationship between an operating degree of accelerator Px and a position of the second throttle valve 213 is obtained, corresponding to the curve F in FIG. 23.

At step 350, an operable gear position responsive to the current operating degree Px is derived from the relationship between the Px and the position of the second throttle valve 213 set at the step 340.

The program then proceeds to step 360 where it is determined whether or not the operable gear position G is the highest. If the determination is YES, the program proceeds to step 370 where it is determined whether the first throttle valve 207 is fully opened. If the determination is NO, the second throttle valve 213 is fully opened at step 380. In case the determination is YES, the program proceeds to step 390 where the second throttle valve 213 is adjusted in response to the current gear position G.

Back to the step 360, if the current gear position G is not the highest, (i.e., the determination is NO), the program proceeds to step 400 where the respective fuel consumption ratio at operable gears is computed in order to obtain the gear position yielding the best fuel consumption ratio. At step 410, it is determined whether the current gear position G is operable. If the determination is YES, the program proceeds to step 420 where it is determined whether a fuel consumption ratio at the current gear position G is within a predetermined range of a better fuel consumption ratio. If the determination is YES, the position of the second throttle valve 213 is adjusted at the step 390. On the contrary, in case the determination made at the step either 410 or 420 is NO, the gear is changed to the one yielding the best fuel consumption ratio and the position of the second throttle valve 213 is adjusted at step 430.

Accordingly, the driving force is kept constant throughout gear changing by controlling the position of the second throttle valve 213, thereby preventing the change in the driving force.

What is claim is:

1. A driving power control system for a vehicle having an automatic transmission which connects to an engine, receives an engine power output from said engine and transmits a driving power to a driving wheel via a gear of the transmission, comprising:
    means for detecting a present gear position and for determining a subsequent gear position when a shift in gear positions is required in the automatic transmission;
    means for detecting variables indicative of an operating degree of an acceleration mechanism and a running condition of the vehicle, respectively, and for computing a desired driving power in accordance with the detected variables;
    engine output control means for controlling an engine output;
    means for computing a first desired operating amount for the engine output control means so as to generate the desired driving power at the present gear position, and for controlling the engine output control means to operate at the computed first desired amount at the start of a shift in gear positions; and
    means for computing a second desired operating amount for the engine output control means so as to generate said desired driving power at the shifted gear position, and for controlling the engine output control means to operate at the computed second desired amount upon the completion of the shift in gear positions, thereby substantially equalizing said driving ower before and after the shift in gear positions.

2. The driving power control system for the vehicle according to claim 1, wherein said operating amount is computed in accordance with a gear position.

3. The driving power control system for the vehicle according to claim 1 wherein said engine output control means includes a second throttle valve provided in an air passage having a first throttle valve connected to said acceleration mechanism.

4. The driving power control system for the vehicle according to claim 3 including:
   means for computing said desired driving power in response to an engine load and a first gear position before said shift in gear positions,
   means for computing said desired driving power after said shift in gear positions in response to said engine load and a second gear position after said shift change when said shift in gear positions,
   whereby said engine output control means comprises a throttle.

5. The driving power control system for the vehicle according to claim 1 including:
   means for computing said desired driving power in response to an engine load and a first gear position before said shift in gear positions,
   means for computing said desired driving power after said shift in gear positions in response to said engine load and a second gear position after said shift in gear positions.

6. The driving power control system for the vehicle according to claim 5, wherein said engine load is a function of a specific volume of intake air.

7. The driving power control system for the vehicle according to claim 5, wherein said engine load is a function of a throttle valve.

8. The driving power control system of claim 1 wherein said means for computing a desired driving power comprise means for changing said driving power linearly relative to a vehicle acceleration.

9. The driving power control system of claim 1 including means for computing said operating degree of an acceleration mechanism at a constant speed, comprising a vehicle speed sensor, a slope sensor and a gear position sensor.

10. The driving power control system of claim 1 including means for determining a best gear position in accordance with a fuel consumption curve, wherein said desired operating amount is determined as a function of said best gear position.

11. The driving power control system of claim 1 including means for determining a driving power at a present gear position based on an engine torque characteristic curve as a function of vehicle speed, means for determining a maximum positive driving power and a maximum negative driving power, and means for corresponding said operating degree of an accelerator mechanism with values of said driving power.

12. The driving power control system of claim 1 including means for computing a rolling resister, air resister and slope resister in accordance with sensed slope and vehicle data.

13. The driving power control system of claim 12 including means for calculating a maximum acceleration in accordance with an engine characteristic curve, a detected engine speed and said computed rolling resister, air resister and slope resister.

14. The driving power control system of claim 1 wherein said means for computing a desired driving power comprise means for predetermining a continuous and gradual relationship between said operating degree of an acceleration mechanism and a desired vehicle acceleration based upon variables indicative of said running condition of the vehicle, and means for determining a desired vehicle acceleration in accordance with a detected value of said operating degree and said predetermined relationship.

15. The driving power control system of claim 14 where in said variables include an engine load, a gear position and a vehicle running speed.

16. The driving power control system of claim 14 where in said continuous and gradual relationship is linear.

17. The driving power control system of claim 14 including means for calculating said desired vehicle acceleration based upon an operating degree of an acceleration mechanism at a constant speed and a maximum acceleration.

* * * * *